US009032029B2

(12) United States Patent
Diner et al.

(10) Patent No.: US 9,032,029 B2
(45) Date of Patent: May 12, 2015

(54) COMMUNICATION HUB FOR PRESENTING AUDIO-VISUAL DATA FROM ELECTRONIC DEVICES AND METHOD OF PROVIDING AND USING THE SAME

(75) Inventors: Jake Diner, Redondo Beach, CA (US); Timothy Brewer, San Diego, CA (US); Michael Tad LeDuc, Rochester, NY (US); Jimmy K. Lau, Temple City, CA (US); Luis Artiz, Pasadena, CA (US)

(73) Assignee: Belkin International, Inc., Playa Vista, CA (US)

( * ) Notice: Subject to any disclaimer, the term of this patent is extended or adjusted under 35 U.S.C. 154(b) by 257 days.

(21) Appl. No.: 13/591,066

(22) Filed: Aug. 21, 2012

(65) Prior Publication Data
US 2012/0324047 A1 Dec. 20, 2012

Related U.S. Application Data

(63) Continuation of application No. PCT/US2012/042812, filed on Jun. 15, 2012.

(60) Provisional application No. 61/498,253, filed on Jun. 17, 2011.

(51) Int. Cl.
G06F 15/16 (2006.01)
H04L 29/06 (2006.01)
H04W 4/20 (2009.01)
H04N 7/15 (2006.01)
H04W 4/08 (2009.01)

(52) U.S. Cl.
CPC ............ *H04L 65/403* (2013.01); *H04N 7/15* (2013.01); *H04W 4/08* (2013.01); *H04W 4/206* (2013.01)

(58) Field of Classification Search
USPC .................. 709/202–205, 217–219; 345/204
See application file for complete search history.

(56) References Cited

U.S. PATENT DOCUMENTS

| 7,860,874 | B2 * | 12/2010 | Karklins et al. | ............... 709/218 |
| 8,924,471 | B2 * | 12/2014 | Stich et al. | ..................... 709/203 |
| 2001/0050679 | A1 * | 12/2001 | Shigeta | .......................... 345/204 |
| 2005/0248652 | A1 | 11/2005 | Firestone et al. | |
| 2010/0095342 | A1 | 4/2010 | Gandhi et al. | |
| 2010/0333175 | A1 | 12/2010 | Cox et al. | |
| 2011/0007159 | A1 * | 1/2011 | Camp et al. | ..................... 348/143 |
| 2011/0072482 | A1 | 3/2011 | Lau | |
| 2012/0054400 | A1 * | 3/2012 | Iverson et al. | ................. 710/303 |
| 2013/0297689 | A1 * | 11/2013 | Bhat et al. | ..................... 709/204 |

FOREIGN PATENT DOCUMENTS

| EP | 1073028 | 1/2001 |
| EP | 1178683 A2 | 6/2002 |

OTHER PUBLICATIONS

International Search Report and Written Opinion for PCT Application No. PCT/US2012/042812, 11 pages, Feb. 20, 2013.

* cited by examiner

*Primary Examiner* — Bharat N Barot
(74) *Attorney, Agent, or Firm* — Bryan Cave LLP

(57) ABSTRACT

Some embodiments include a communication hub for presenting audio-visual data from electronic devices. Other embodiments of related systems and methods are disclosed.

24 Claims, 20 Drawing Sheets

COMMUNICATION HUB FOR PRESENTING AUDIO-VISUAL DATA FROM ELECTRONIC DEVICES AND METHOD OF PROVIDING AND USING THE SAME

CROSS-REFERENCE TO RELATED APPLICATIONS

This application is continuation of International Patent Application No. PCT/US2012/042812, filed Jun. 15, 2012. International Patent Application No. PCT/US2012/042812 claims the benefit of U.S. Provisional Application No. 61/498,253, filed Jun. 17, 2011. International Patent Application No. PCT/US2012/042812 and U.S. Provisional Application No. 61/498,253 are incorporated by reference herein in their entirety.

FIELD OF THE INVENTION

This invention relates generally to communication hubs, and relates more particularly to such communication hubs for presenting audio-visual data from multiple electronic devices and methods of providing and using the same.

DESCRIPTION OF THE BACKGROUND

When presenting audio-visual data via one or more audio-visual devices during a conference, it can be cumbersome and/or inconvenient for the participants of the conference to individually couple each electronic device of the multiple electronic devices to the one or more audio-visual devices in order to present the audio-visual data stored on the multiple electronic devices to the various participants of the conference. Accordingly, a need or potential for benefit exists for an apparatus or system that facilitates communication between the multiple electronic devices and the one or more audio-visual devices.

BRIEF DESCRIPTION OF THE DRAWINGS

To facilitate further description of the embodiments, the following drawings are provided in which.

Figure 1:
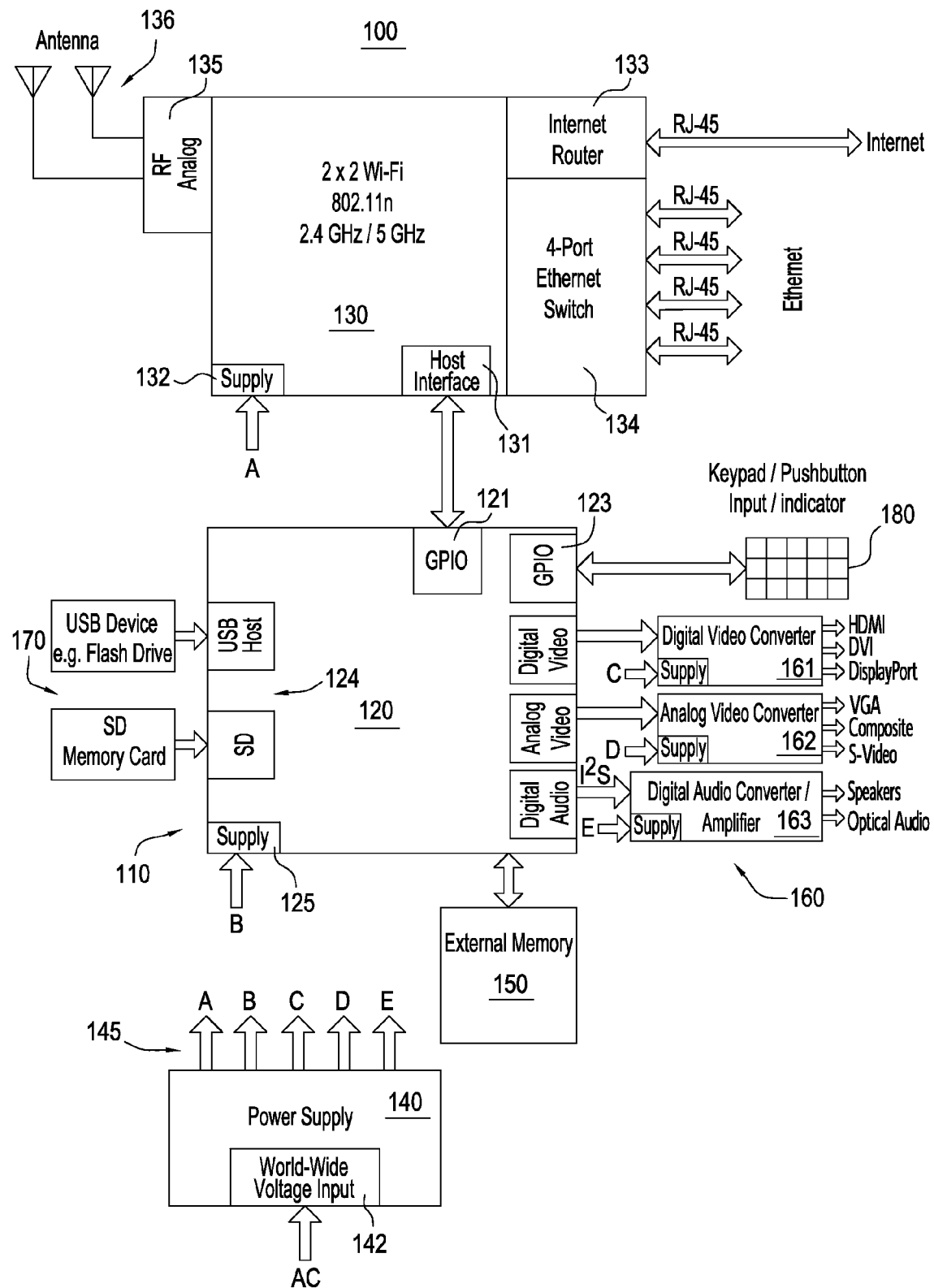
FIG. 1 provides a block diagram illustrating exemplary circuitry of a communication hub, according to the embodiment of FIG. 16.

For simplicity and clarity of illustration, the drawing figures illustrate the general manner of construction, and descriptions and details of well-known features and techniques can be omitted to avoid unnecessarily obscuring the invention. Additionally, elements in the drawing figures are not necessarily drawn to scale. For example, the dimensions of some of the elements in the figures can be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but can include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements can be electrically coupled together, but not be mechanically or otherwise coupled together; two or more mechanical elements can be mechanically coupled together, but not be electrically or otherwise coupled together; two or more electrical elements can be mechanically coupled together, but not be electrically or otherwise coupled together. Coupling can be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

The term "mobile electronic device" as used herein refers to at least one of a digital music player, a digital video player, a digital music and video player, a cellular phone (e.g., smartphone), a personal digital assistant, a handheld digital computer (e.g., a tablet personal computer), a laptop computer (e.g., a notebook computer, a netbook computer), or another portable device with the capability to present audio and/or visual data (e.g., images, videos, music, etc.). For example, a mobile electrical device can comprise the iPod® or iPhone® or iTouch® or iPad® or MacBook® product by Apple Inc. of Cupertino, Calif. Likewise, a mobile electrical device can comprise a Blackberry® product by Research in Motion (RIM) of Waterloo, Ontario, Canada, or a different product by a different manufacturer.

The term "computer network" as used herein can refer to a collection of computers and devices interconnected by communications channels that facilitate communications among users and allows users to share resources (e.g., an internet connection, an Ethernet connection, etc.). The computers and devices can be interconnected and/or implemented according to any one or any combination of wired and/or wireless network topologies (e.g., bus, star, tree, line, ring, mesh, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.), as desirable. Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3, IEEE 802.11, etc.; and exemplary cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/Time Division Multiple Access (TDMA)), Integrated Digital Enhanced Network (iDEN), etc. The components implementing the wired and/or wireless communication can be dependent on the network topologies and/or protocols in use, and vice versa.

DETAILED DESCRIPTION OF EXAMPLES OF EMBODIMENTS

Some embodiments include a system. The system comprises a communication hub. The communication hub is configured (a) to communicate with multiple electronic devices and at least one audio-visual device. Further, the communication hub is configured to be paired with the multiple electronic devices when communicating with the multiple electronic devices. The multiple electronic devices can be separate from the communication hub. Meanwhile, the communication hub can receive audio-visual data from any one electronic device of the multiple electronic devices when the any one electronic device of the multiple electronic devices is operating as an active electronic device of the multiple electronic devices. Furthermore, the communication hub can provide the audio-visual data to the audio-visual device(s). The audio-visual device(s) can present the audio-visual data to at least one user of the system.

Various embodiments include a system. The system comprises a communication hub application software configured to be used at an electronic device. The communication hub application software can be executed at one or more processing modules and stored at one or more memory storage modules of an electronic device computer system. Meanwhile, the communication hub application software can permit the electronic device to be paired with a communication hub when the electronic device is communicating with the communication hub. The communication hub can be configured to communicate with multiple electronic devices and at least one audio-visual device, and the multiple electronic devices can be separate from the communication hub and/or can comprise the electronic device. Further, the communication hub application software can permit the electronic device to operate as an active electronic device of the multiple electronic devices. The active electronic device can provide audio-visual data to the communication hub when the electronic device is operating as the active electronic device of the multiple electronic devices. Likewise, the communication hub can provide the audio-visual data to the audio-visual device(s), and the audio-visual device(s) can present the audio-visual data to at least one user of the system.

Further embodiment include a method of manufacturing a communication hub. The method can comprise: configuring the communication hub to communicate with and to be paired with multiple electronic devices, the multiple electronic devices being separate from the communication hub; configuring the communication hub to communicate with at least one audio-visual device; configuring the communication hub to receive audio-visual data from any one electronic device of the multiple electronic devices when the any one electronic device of the multiple electronic devices is operating as an active electronic device of the multiple electronic devices; and configuring the communication hub to provide the audio-visual data to the audio-visual device(s), the audio-visual device(s) being configured to present the audio-visual data to at least one user of the communication hub.

Other embodiments include a method of manufacturing a communication hub software application to be used at an electronic device. The communication hub application software can be executed at one or more processing modules and/or stored at one or more memory storage modules of an electronic device computer system. The method can comprise: configuring the communication hub application software to permit the electronic device to be paired with a communication hub when the electronic device is communicating with the communication hub, the communication hub being configured to communicate with multiple electronic devices and at least one audio-visual device and the multiple electronic devices (a) being separate from the communication hub and (b) comprising the electronic device; and configuring the communication hub application software to permit the electronic device to operate as an active electronic device of the multiple electronic devices, the active electronic device being able to provide audio-visual data to the communication hub when the electronic device is operating as the active electronic device of the multiple electronic devices where the communication hub is configured to provide the audio-visual data to the audio-visual device(s), and the audio-visual device(s) is configured to present the audio-visual data to at least one user of the system.

Still other embodiment include a method of operating a communication hub. At least part of the method can be implemented via execution of computer instructions configured to run at one or more processing modules and configured to be stored at one or more memory storage modules of the communication hub. The method can comprise: executing one or more first computer instructions configured to establish communication of the communication hub with at least one audio-visual device; executing one or more second computer instructions configured to establish communication of the communication hub with, and to pair the communication hub with, multiple electronic devices; after or when executing the one or more second computer instructions, executing one or more third computer instructions configured to assign an active electronic device status to a first electronic device of the multiple electronic devices; executing one or more fourth computer instructions configured to receive first audio-visual data from the first electronic device when the first electronic device is operating with the active electronic device status; and after or when executing the one or more first computer instructions or the one or more fourth computer instructions, executing one or more fifth computer instructions configured to provide the first audio-visual data to the at least one audio-visual device. The computer instruction(s) comprise the first, second, third, fourth, and/or fifth computer instructions.

Figure 16:
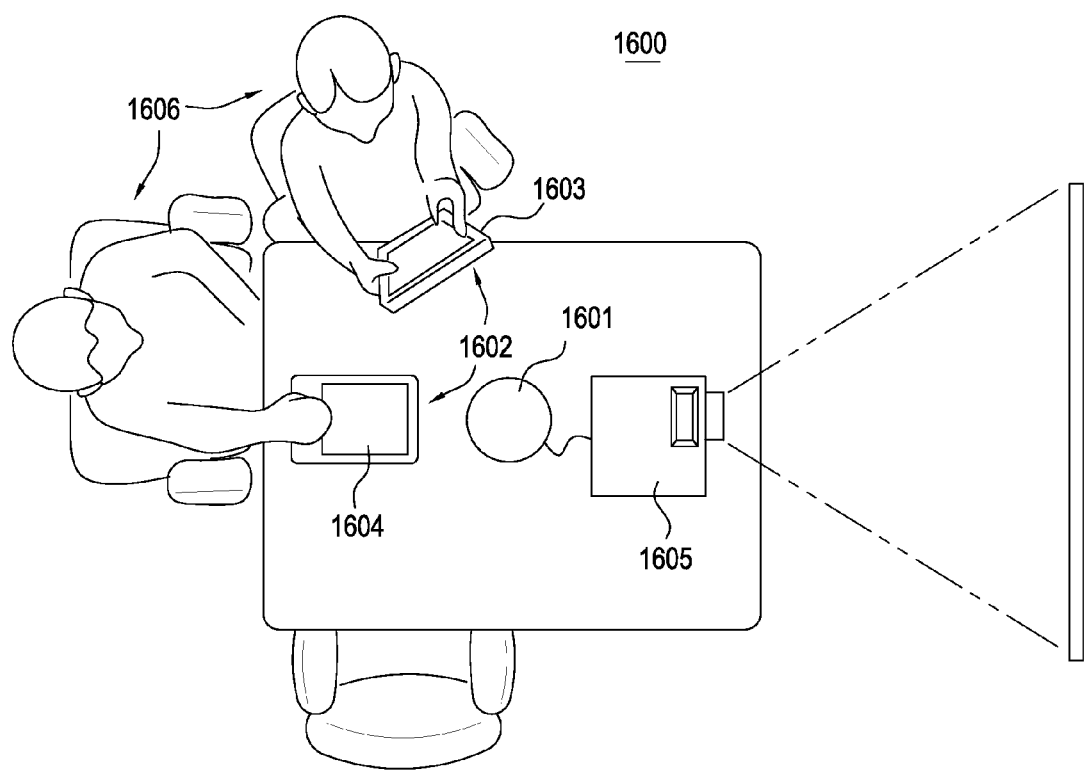
FIG. 16 illustrates a system, according to an embodiment.

Turning to the drawings, FIG. 16 illustrates system 1600, according to one embodiment. System 1600 is merely exemplary and is not limited to the embodiments presented herein. System 1600 can be employed in many different embodiments or examples not specifically depicted or described herein. System 1600 can be configured to permit multiple users (e.g., user(s) 1606) to communicate and present audio-visual data with one another (e.g., during a conference) by connecting electronic devices (e.g., multiple electronic devices 1602) of the multiple users with a communication hub (e.g., communication hub 1601) that can receive the audio-visual data from the electronic devices and provide the audio-visual data to an audio-visual device (e.g., audio-visual device 1605) so that the audio-visual device can present the audio-visual data to the multiple users.

Figure 13:
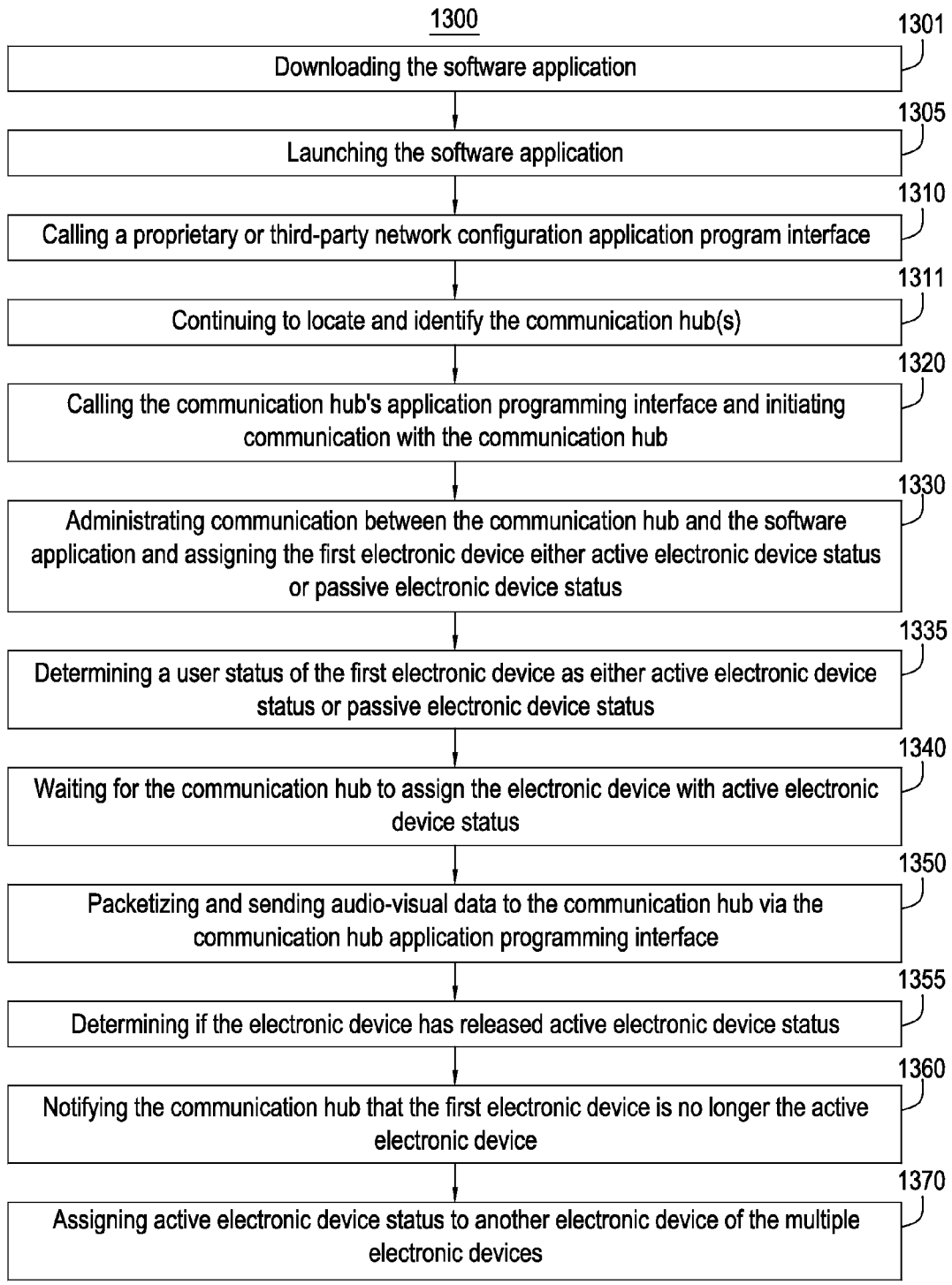
FIG. 13 illustrates an exemplary embodiment of a method of using a software application at an electronic device of multiple electronic devices to permit communication between the electronic device and a communication hub.

Referring now to FIG. 16, system 1600 comprises communication hub 1601. Communication hub 1601 is configured to communicate (e.g., via wired and/or wireless communication) with multiple electronic devices 1602. Multiple electronic devices 1602 can be operated by user(s) 1606. In many embodiments, at least part of communication hub 1601 can be configured to resemble at least part of a globe or an orb. Communication hub 1601 can also be configured to be placed on a table (e.g., at the center of a conference table). Each of multiple electronic devices 1602 can be configured to run a software application (e.g., a communication hub application software) in order for multiple electronic devices 1602 to communicate and/or pair with communication hub 1601. Further, the application software can permit multiple electronic devices 1602 to cooperate with communication hub 1601 to provide some or all of the functionality of system 1600. FIG. 13, as described below, illustrates an exemplary embodiment of method 1300 of using a software application at an electronic device of multiple electronic devices to permit communication between the electronic device and a communication hub.

Although in some embodiments one or more of multiple electronic devices 1602 can be integral with communication hub 1601, in many embodiments, multiple electronic devices 1602 are separate from communication hub 1601. In this embodiment, one or more electronic devices of multiple electronic devices 1602 can be located proximate to, while remaining physically separate from, communication hub 1601; and/or one or more electronic devices of multiple electronic devices 1602 can be located remotely from communication hub 1601 in addition to being physically separate from communication hub 1601. For example, communication hub 1601 can permit some of user(s) 1606 to be present at a conference with their respective electronic devices of multiple electronic devices 1602 while others of user(s) 1606 are at another location away from connection hub 1601 and are communicating with connection hub 1601 and the local user(s) 1606, remotely. Accordingly, system 1600 and/or communication hub 1601 can comprise and/or can be used along with at least one device permitting remote voice communication (e.g., a conference telephone) between users 1606, such as, for example, when one or more of multiple electronic devices 1602 are located remotely from communication hub 1601. Skipping back in the drawings, FIGS. 9-12 illustrate examples of system 1600 in which communication hub 1601 is communicating with multiple electronic devices 1602, according to the embodiment of FIG. 16.

Figure 9:
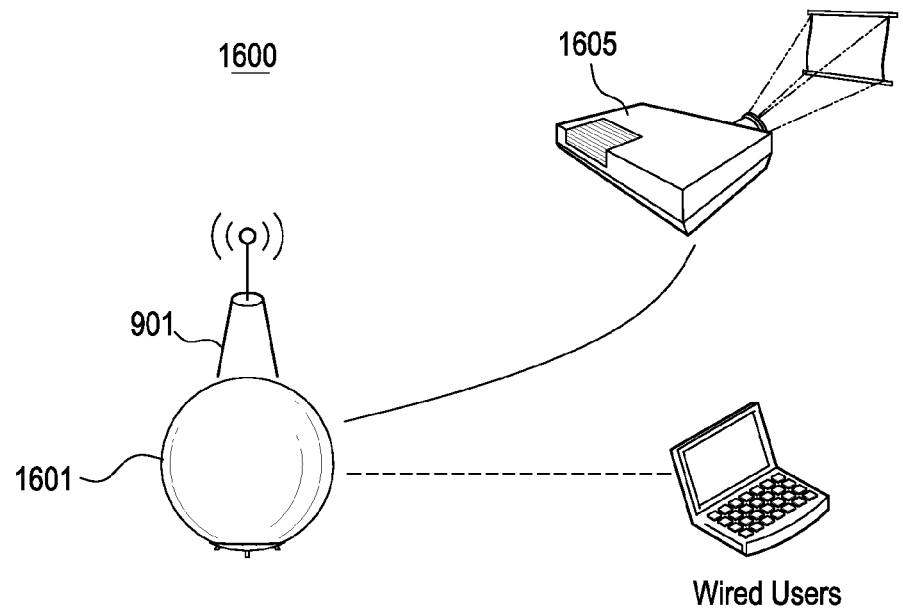
FIG. 9 illustrates an example of the system of FIG. 16 in which a communication hub is communicating with multiple electronic devices.
Figure 9:
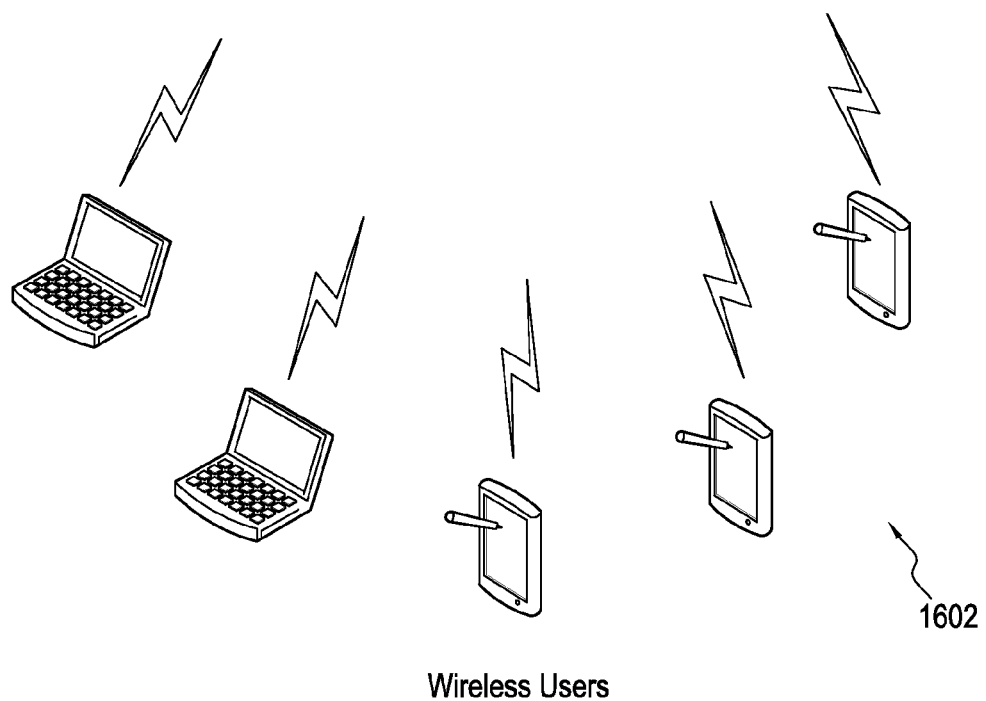

Referring now to FIG. 9, in some embodiments, communication hub 1601 (FIG. 16) can comprise integrated wireless access point 901 (e.g., implemented via wired/wireless communication component 130 (FIG. 1) and antenna(s) 136 (FIG. 1), as described below) by which one or more electronic devices of multiple electronic devices 1602 (FIG. 16) and/or audio-visual device 1605 (FIG. 16) can directly and wirelessly communicate with communication hub 1601 (FIG. 16). In some embodiments, integrated wireless access point 901 can comprise a wireless connection provided by a wireless network connection (e.g., (a) a wireless local area network (WLAN) connection) and/or (b) a mesh network connection and/or personal area network (PAN) connection). Exemplary PAN protocol(s) can comprise Bluetooth, Zigbee, Wireless Universal Serial Bus (USB), Z-Wave, etc.; exemplary WLAN protocol(s) can comprise Institute of Electrical and Electronic Engineers (IEEE) 802.11, etc. In the same or different embodiments, one or more electronic devices of multiple electronic devices 1602 (FIG. 16) and/or audio-visual device 1605 (FIG. 16) can be coupled with communication hub 1601 via an Ethernet cable (e.g., an RJ-45 cable) or at least one audio-visual cable, as described below, to permit direct wired communication between the one or more electronic devices and/or audio-visual device 1605 and communication hub 1601 (FIG. 16).

In some embodiments, integrated wireless access point 901 can be implemented by electrically tethering an electronic device of multiple electronic devices 1602 (FIG. 16) to communication hub 1601 (FIG. 16), where the electronic device is configured to wirelessly communicate with external wireless access point 1101 (FIG. 11) (e.g., via the internet), as described below, and/or a cellular telephone network. Exemplary cellular telephone network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/Time Division Multiple Access (TDMA)), Integrated Digital Enhanced Network (iDEN), etc. In these embodiments, by tethering communication hub 1601 (FIG. 16) to the electronic device, communication hub 1601 (FIG. 16) can provide a wireless hotspot via the electronic device (e.g., integrated wireless access point 901) to which one or more electronic devices of multiple electronic devices 1602 (FIG. 16) can electrically couple.

Figure 10:
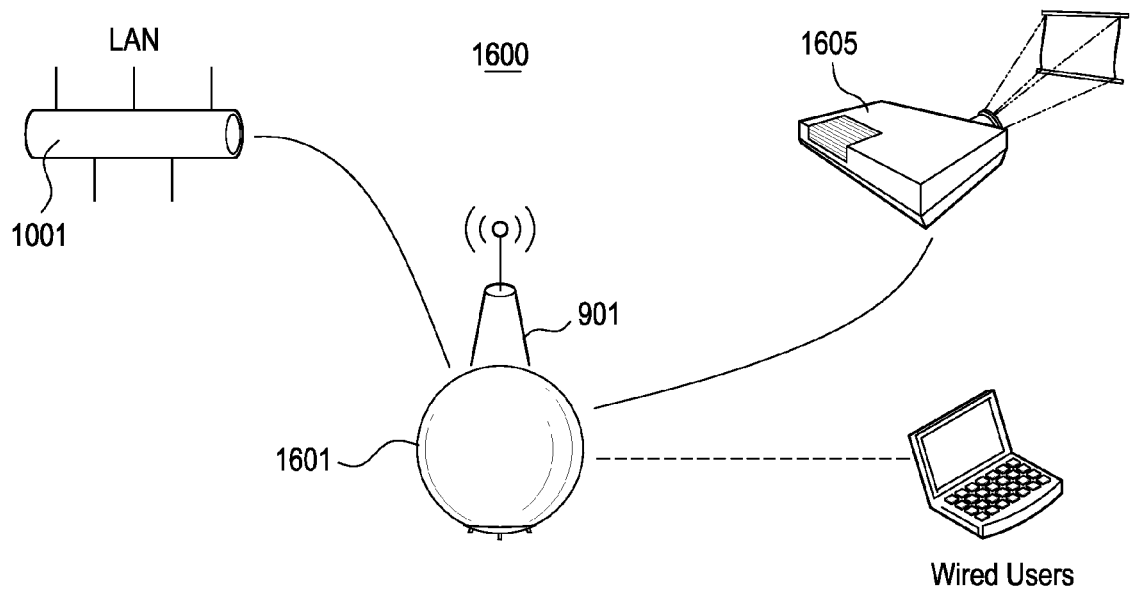
FIG. 10 illustrates another example of the system of FIG. 16 in which the communication hub is communicating with multiple electronic devices.
Figure 10:
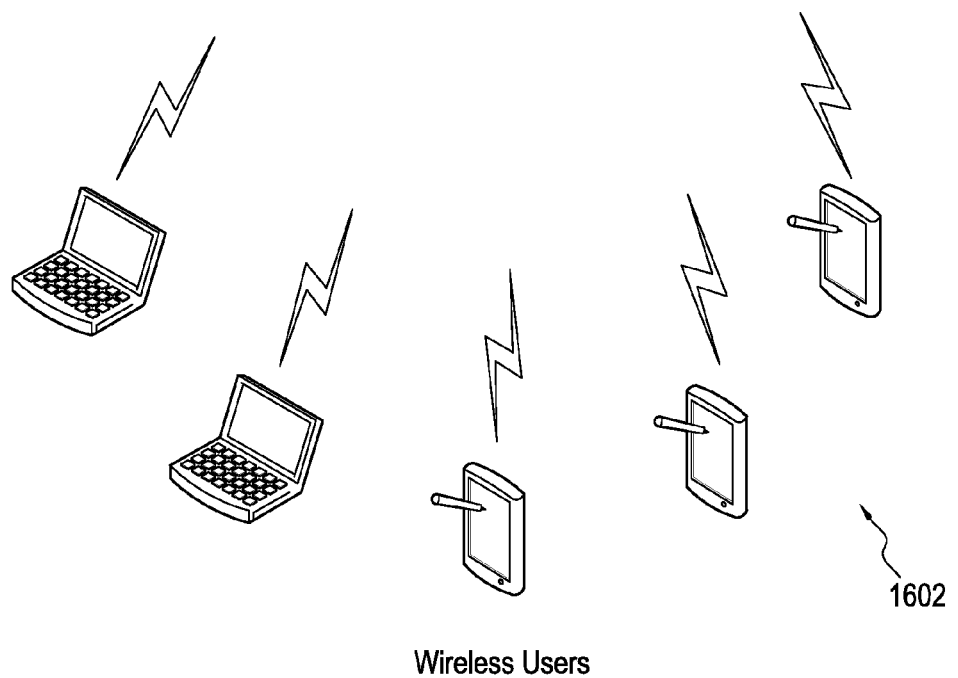

Referring now to FIG. 10, in the same or different embodiments, system 1600 (FIG. 16) can comprise wired network connection 1001 and/or communication hub 1601 (FIG. 16) can be configured to permit communication via wired network connection 1001 (e.g., a wired local area network (LAN) or a wide area network (WAN) connection). Accordingly, one or more electronic devices of multiple electronic devices 1602 (FIG. 16) can indirectly communicate with communication hub 1601 (FIG. 16) via the wired network connection 1001. For example, wired network connection 1001 can be part of the computer network of the building in which communication hub 1601 (FIG. 16) is being used by user(s) 16. Meanwhile, both communication hub 1601 (FIG. 16) and the one or more electronic devices of multiple electronic devices 1602 (FIG. 16) can then communicate with each other (e.g., via the internet) through wired network connection 1001. In these embodiments, the one or more electronic devices can be located remotely from communication hub 1601 (e.g., another room, building, city, state, country, etc.). In these embodiments, system 1600 (FIG. 16) can still comprise integrated wireless access point 901 (FIG. 9). Further, communication hub 1601 (FIG. 16) can still be configured to directly communicate via integrated wireless access point 901 (FIG. 9) with multiple electronic devices 1602 (FIG. 16) and/or audio-visual device 1605 (FIG. 16); and/or communication hub 1601 (FIG. 16) can still be configured to communicate via direct wired coupling with multiple electronic devices 1602 (FIG. 16) and/or audio-visual device 1605 (FIG. 16).

Figure 11:
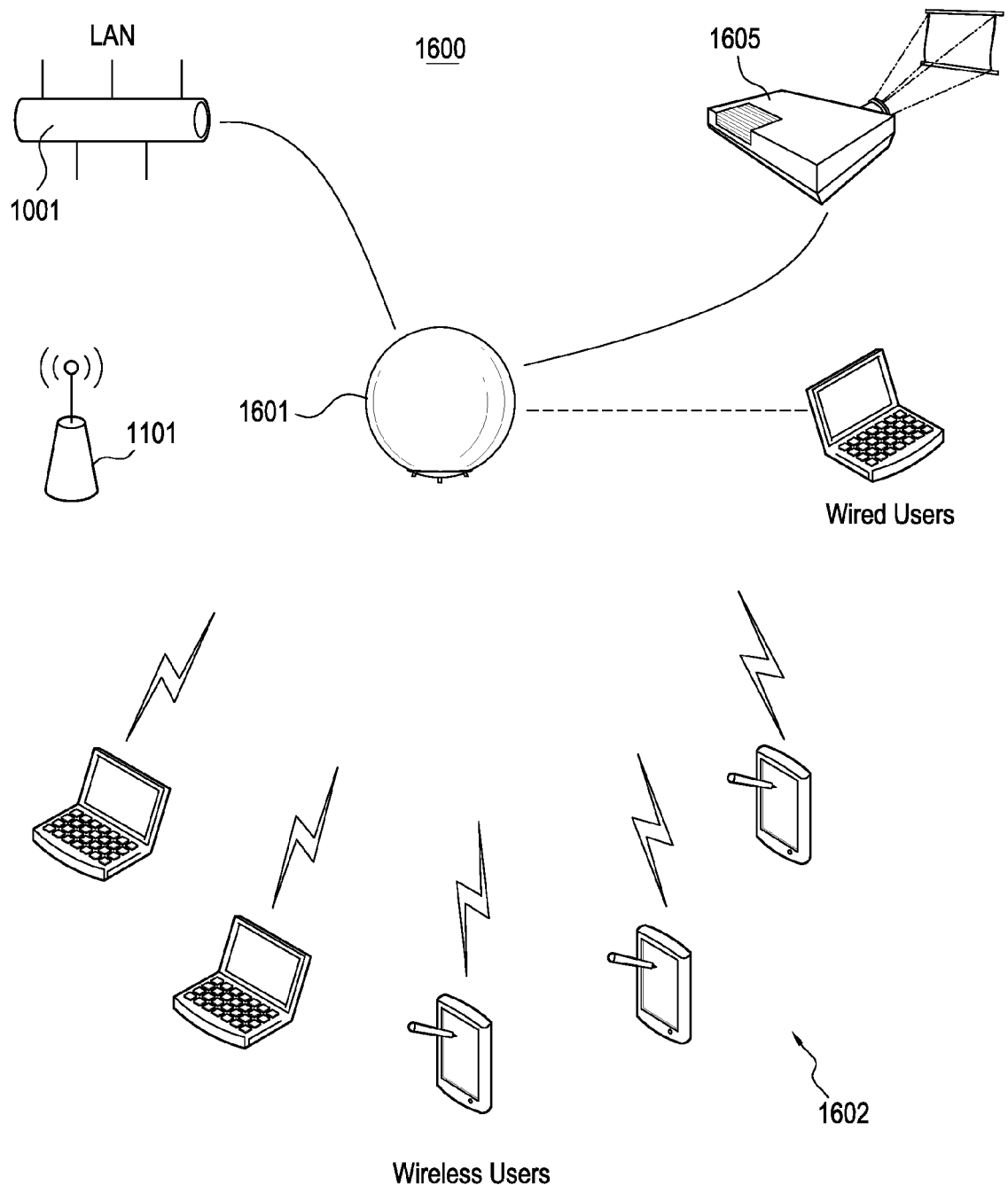
FIG. 11 illustrates another example of the system of FIG. 16 in which the communication hub is communicating with multiple electronic devices.

Referring now to FIG. 11, in the same or different embodiments, system 1600 (FIG. 16) can comprise external wireless access point 1101 and/or communication hub 1601 (FIG. 16) can be configured to permit indirect communication via external wireless access point 1101 (e.g., a wireless network connection). Similar to wired network connection 1001 (FIG. 10), external wireless access point 1101 can be part of a computer network of the building in which communication hub 1601 (FIG. 16) is being used by user(s) 1606. Accordingly, one or more electronic devices of multiple electronic devices 1602 (FIG. 16) can communicate with communication hub 1601 (FIG. 16) via external wireless access point 1101. For example, in the example of FIG. 11, both external wireless access point 1101 and wired network connection 1001 (FIG. 10) can be part of the computer network of the building in which communication hub 1601 (FIG. 16) is being used by user(s) 1606. Meanwhile, one or more electronic devices of multiple electronic devices 1602 (FIG. 16) can then communicate via the computer network with wireless external wireless access point 1101. Communication hub 1601 (FIG. 16) can then be configured to receive any communications between the one or more electronic devices of multiple electronic devices 1602 (FIG. 16) and external wireless access point 1101 via wired network connection 1001 (FIG. 10). In these embodiments, system 1600 (FIG. 16) can also comprise integrated wireless access point 901 (FIG. 9) and/or wired network connection 1001 (FIG. 10). Likewise, communication hub 1601 (FIG. 16) can also be configured to directly communicate via integrated wireless access point 901 (FIG. 9) (not shown) with multiple electronic devices 1602 (FIG. 16) and/or audio-visual device 1605 (FIG. 16); communication hub 1601 (FIG. 16) can also be configured to indirectly communicate via wired network connection 1001 (FIG. 10) with multiple electronic devices 1602 (FIG. 16) and/or audio-visual device 1605 (FIG. 16); and/or communication hub 1601 (FIG. 16) can also be configured to communicate via direct wired coupling with multiple electronic devices 1602 (FIG. 16) and/or audio-visual device 1605 (FIG. 16).

Figure 12:
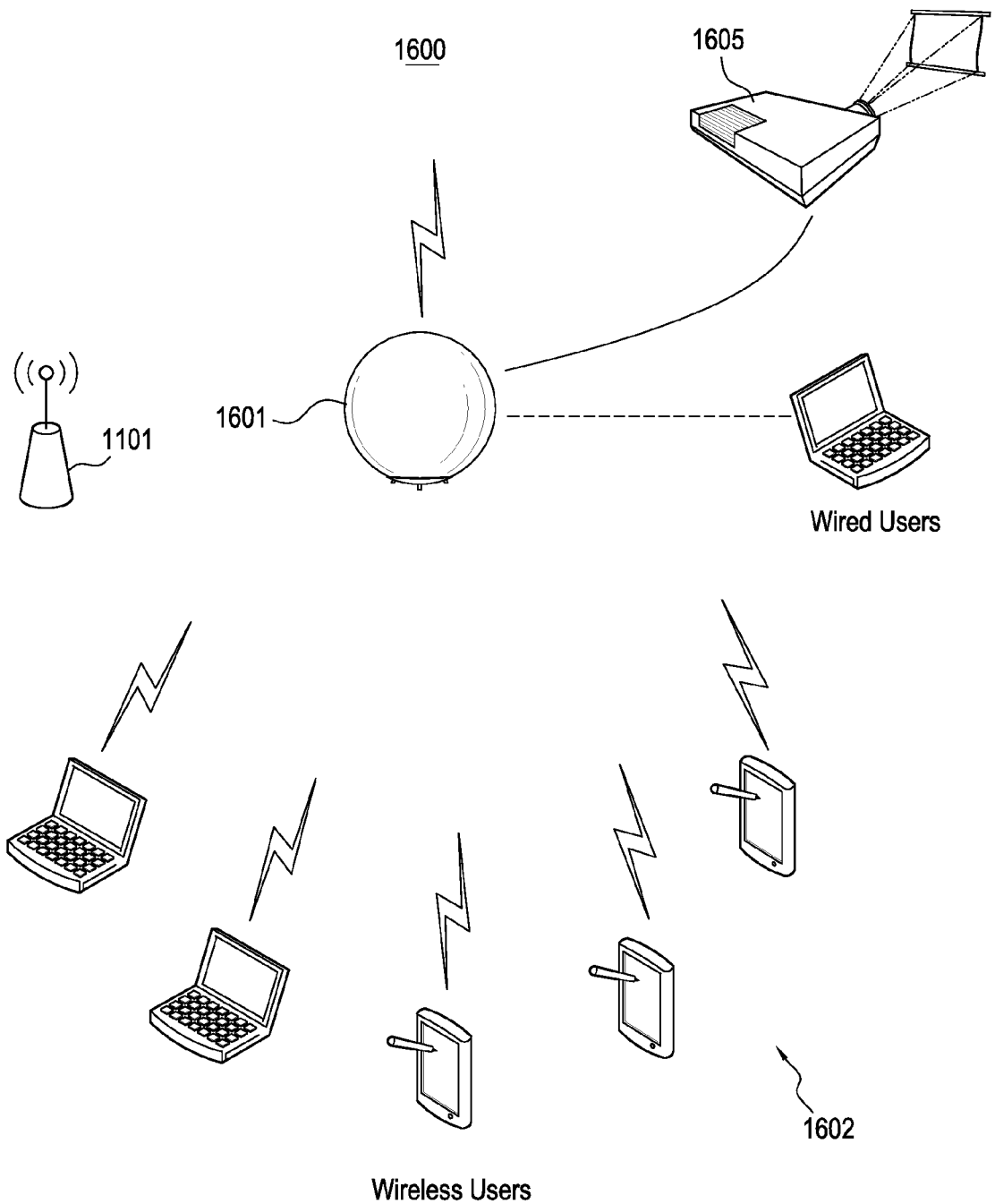
FIG. 12 illustrates another example of the system of FIG. 16 in which the communication hub is communicating with multiple electronic devices.

Referring now to FIG. 12, in the same or different embodiments, communication hub 1601 (FIG. 16) can also be configured to permit indirect communication with one or more electronic devices of multiple electronic devices 1602 (FIG. 16) via external wireless access point 1101 (e.g., a wireless network connection) where communication hub 1601 (FIG. 16) also communicates with the computer network via external wireless access point 1101 (FIG. 11), as opposed to wired network connection 1001 (FIG. 10). In these embodiments, system 1600 (FIG. 16) can also comprise integrated wireless access point 901 (FIG. 9) and/or wired network connection 1001 (FIG. 10). Likewise, communication hub 1601 (FIG. 16) can also be configured to directly communicate via integrated wireless access point 901 (FIG. 9) (not shown) with multiple electronic devices 1602 (FIG. 16) and/or audio-visual device 1605 (FIG. 16); communication hub 1601 (FIG. 16) can also be configured to indirectly communicate via wired network connection 1001 (FIG. 10) with multiple electronic devices 1602 (FIG. 16) and/or audio-visual device 1605 (FIG. 16); communication hub 1601 (FIG. 16) can also be configured to communicate via direct wired coupling with multiple electronic devices 1602 (FIG. 16) and/or audio-visual device 1605 (FIG. 16); and/or communication hub 1601 (FIG. 16) can also permit indirect communication via external wireless access point 1101 (e.g., a wireless network connection) with multiple electronic devices 1602 (FIG. 16) and/or audio-visual device 1605 (FIG. 16) as illustrated in FIG. 11.

Figure 14:
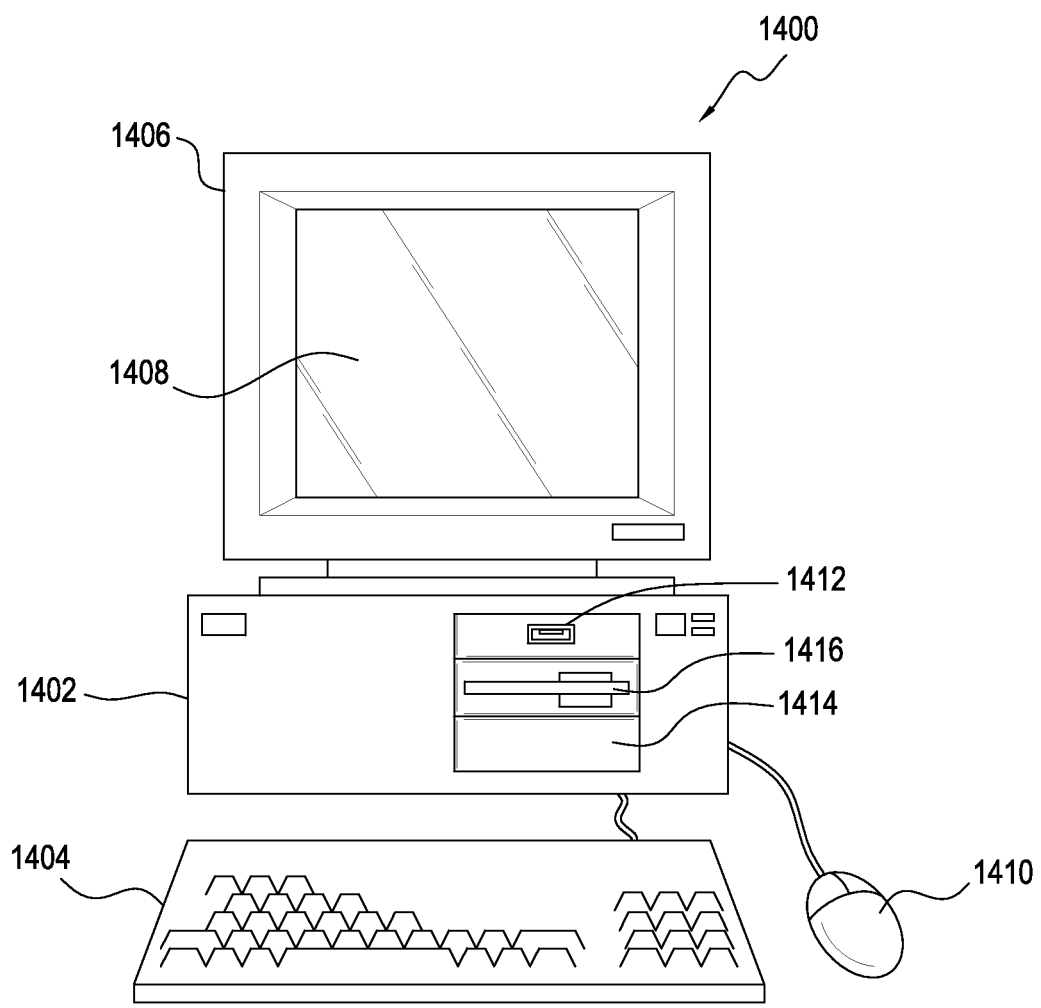
FIG. 14 illustrates a computer system that is suitable for implementing an embodiment of an electronic device the system of FIG. 16.

Returning to FIG. 16, each electronic device (e.g., first electronic device 1603 and at least one other electronic device 1604) of multiple electronic devices 1602 can comprise a computer system. Each computer system can be similar or identical to computer system 1400 (FIG. 14). Further, each electronic device of multiple electronic devices 1602 can comprise a mobile electronic device, as described above.

Figure 15:
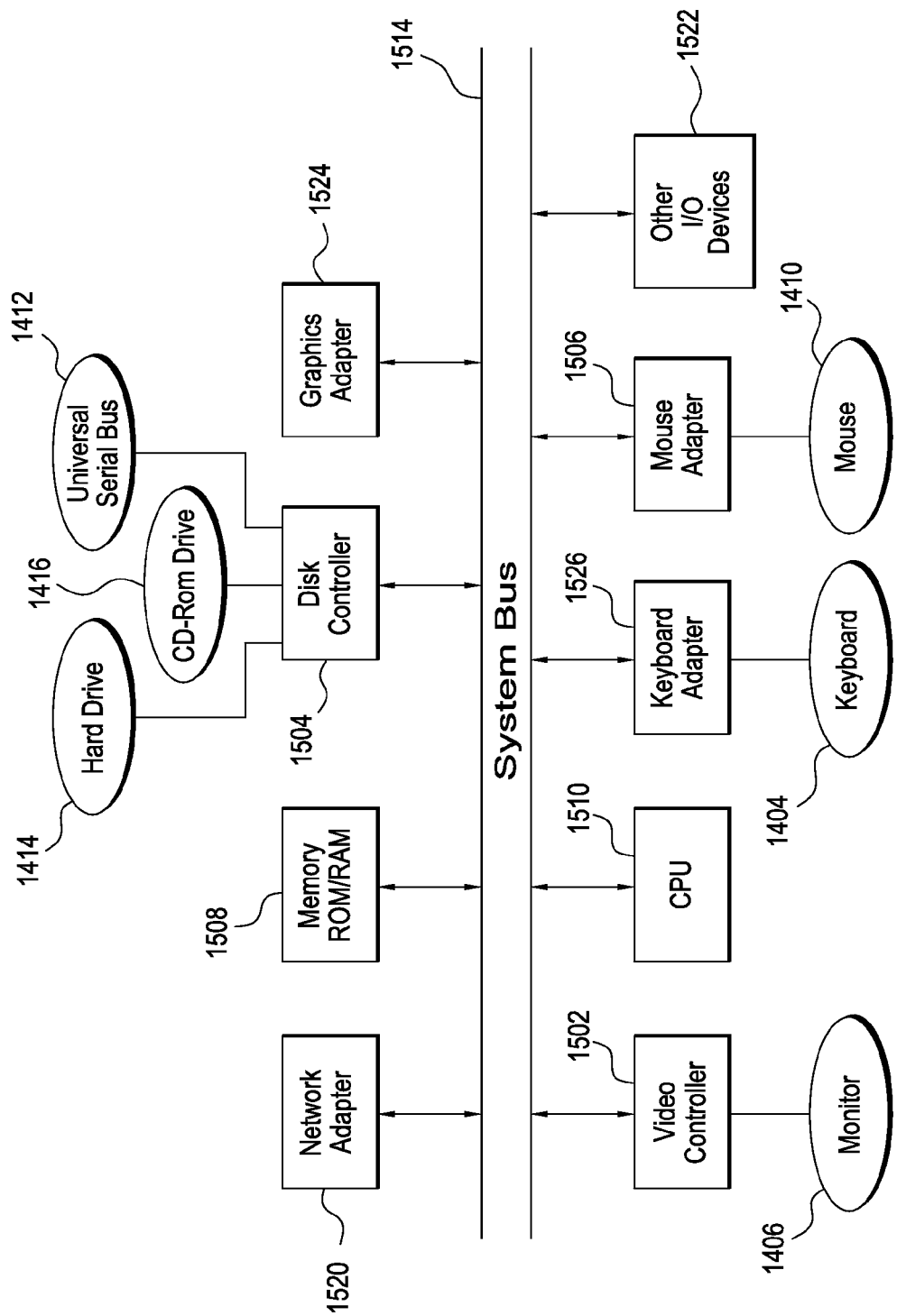
FIG. 15 illustrates a representative block diagram of an example of the elements included in the circuit boards inside a chassis of the computer system of FIG. 14.
Figure 20:
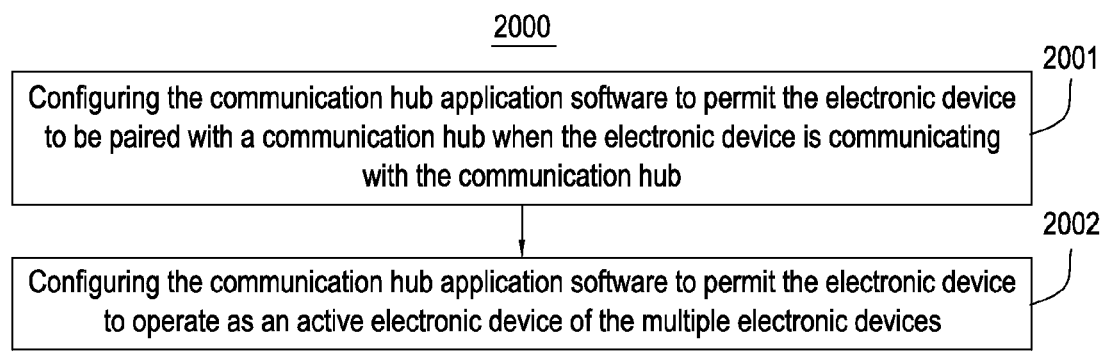
FIG. 20 illustrates a flow chart for an exemplary embodiment of a method of manufacturing a communication hub software application to be used at an electronic device.
Figure 21:
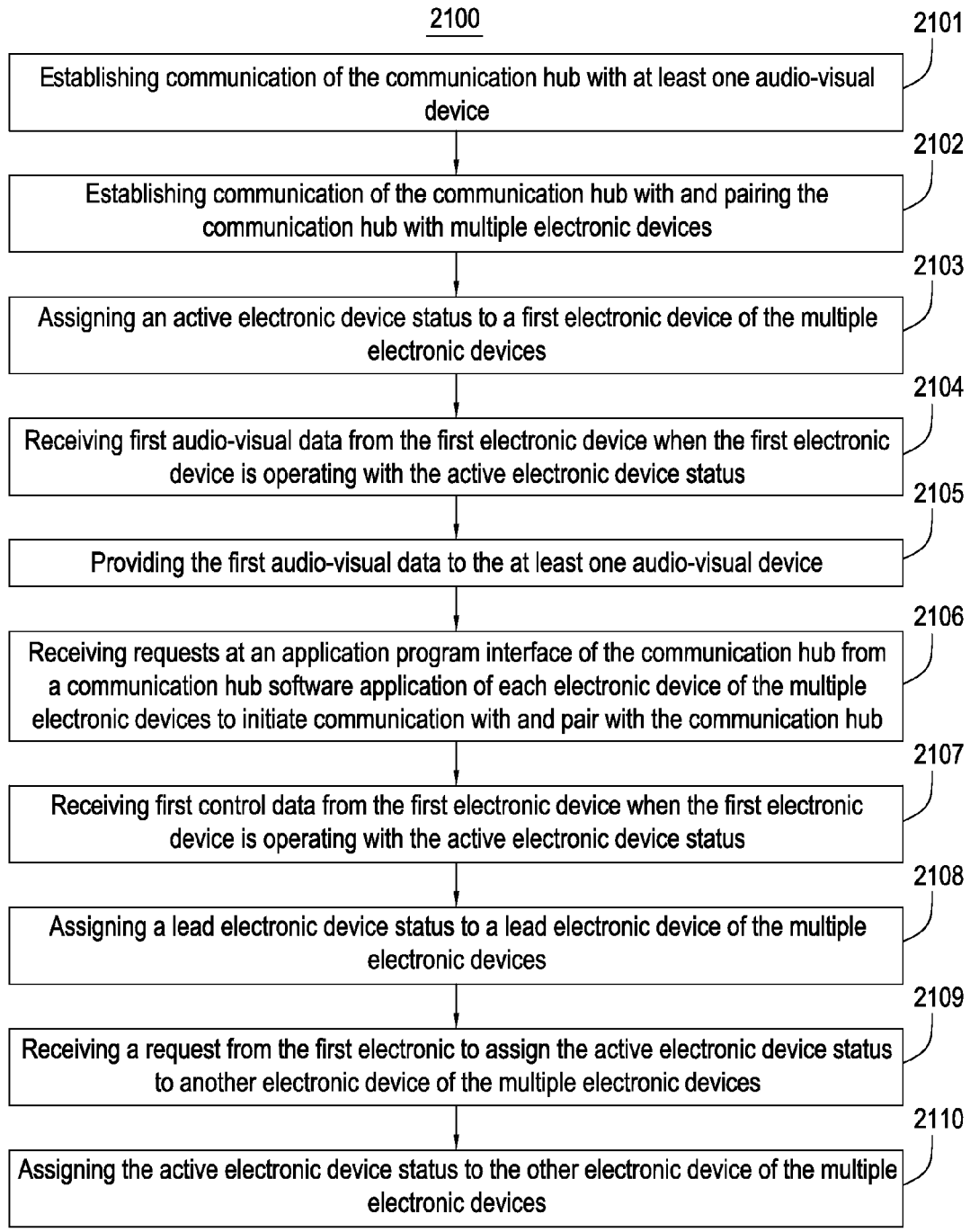
FIG. 21 illustrates a flow chart for an exemplary embodiment of a method of operating a communication hub.

Turning back again in the drawings, FIG. 14 illustrates an exemplary embodiment of computer system 1400 that can be suitable for implementing an embodiment of the computer systems of each electronic device of multiple electronic devices 1602 (FIG. 16) and/or another part of system 1600 (FIGS. 9-12, 16), as well as part or all of method 300 (FIG. 3), method 400 (FIG. 4), method 500 (FIGS. 5 & 17), method 600 (FIG. 6), method 700 (FIGS. 7 & 18), method 800 (FIG. 8), method 1300 (FIG. 13), method 1900 (FIG. 19), method 2000 (FIG. 20), and/or method 2100 (FIG. 21). Computer system 1400 includes chassis 1402 containing one or more circuit boards (not shown), Universal Serial Bus (USB) 1412, Compact Disc Read-Only Memory (CD-ROM) and/or Digital Video Disc (DVD) drive 1416, and hard drive 1414. A representative block diagram of the elements included on the circuit boards inside chassis 1402 is shown in FIG. 14. Central processing unit (CPU) 1510 in FIG. 15 is coupled to system bus 1514 in FIG. 15. In various embodiments, the architecture of CPU 1510 can be compliant with any of a variety of commercially distributed architecture families.

System bus 1514 also is coupled to memory 1508, where memory 1508 includes both read only memory (ROM) and random access memory (RAM). Non-volatile portions of memory 1508 or the ROM can be encoded with a boot code sequence suitable for restoring computer system 1400 (FIG. 14) to a functional state after a system reset. In addition, memory 1508 can include microcode such as a Basic Input-Output System (BIOS). In some examples, the one or more storage modules of the various embodiments disclosed herein can include memory 1508, USB 1412 (FIGS. 14-15), hard drive 1414 (FIGS. 14-15), and/or CD-ROM or DVD drive 1416 (FIGS. 14-15). In the same or different examples, the one or more storage modules of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Examples of common operating systems can include Microsoft® Windows, Mac® operating system (OS), UNIX® OS, and Linux® OS. Common operating systems for a mobile electronic device include the iPhone® operating system by Apple Inc. of Cupertino, Calif., the Blackberry® operating system by Research In Motion (RIM) of Waterloo, Ontario, Canada, the Palm® operating system by Palm, Inc. of Sunnyvale, Calif., the Android operating system developed by the Open Handset Alliance, the Windows Mobile operating system by Microsoft Corp. of Redmond, Wash., or the Symbian operating system by Nokia Corp. of Espoo, Finland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions.

In the depicted embodiment of FIG. 15, various I/O devices such as disk controller 1504, graphics adapter 1524, video controller 1502, keyboard adapter 1526, mouse adapter 1506, network adapter 1520, and other I/O devices 1522 can be coupled to system bus 1514. Keyboard adapter 1526 and mouse adapter 1506 are coupled to keyboard 1404 (FIGS. 14-15) and mouse 1410 (FIGS. 14-15), respectively, of computer system 1400 (FIG. 14). While graphics adapter 1524 and video controller 1502 are indicated as distinct units in FIG. 15, video controller 1502 can be integrated into graphics adapter 1524, or vice versa in other embodiments. Video controller 1502 is suitable for refreshing monitor 1406 (FIGS. 14-15) to display images on a screen 1408 (FIG. 14) of computer system 1400 (FIG. 14). Disk controller 1504 can control hard drive 1414 (FIGS. 14-15), USB 1412 (FIGS. 14-15), and CD-ROM drive 1416 (FIGS. 14-15). In other embodiments, distinct units can be used to control each of these devices separately.

In some embodiments, network adapter 1520 can be part of a WNIC (wireless network interface controller) card (not shown) plugged or coupled to an expansion port (not shown) in computer system 1400. In other embodiments, the WNIC card can be a wireless network card built into computer system 1400. A wireless network adapter can be built into computer system 1400 by having wireless Ethernet capabilities integrated into the motherboard chipset (not shown), or implemented via a dedicated wireless Ethernet chip (not shown), connected through the PCI (peripheral component interconnector) or a PCI express bus. In other embodiments, network adapter 1520 can be a wired network adapter.

Although many other components of computer system 1400 (FIG. 14) are not shown, such components and their interconnection are well known to those of ordinary skill in the art. Accordingly, further details concerning the construction and composition of computer system 1400 and the circuit boards inside chassis 1402 (FIG. 14) are not discussed herein.

When computer system 1400 in FIG. 14 is running, program instructions stored on a USB-equipped electronic device connected to USB 1412, on a CD-ROM or DVD in CD-ROM and/or DVD drive 1416, on hard drive 1414, or in memory 1508 (FIG. 15) are executed by CPU 1510 (FIG. 15). A portion of the program instructions, stored on these devices, can be suitable for carrying out at least part of system 1600 (FIGS. 9-12, 16) and/or part or all of method 300 (FIG. 3), method 400 (FIG. 4), method 500 (FIGS. 5 & 17), method 600 (FIG. 6), method 700 (FIGS. 7 & 18), method 800 (FIG. 8), method 1300 (FIG. 13), method 1900 (FIG. 19), method 2000 (FIG. 20), and/or method 2100 (FIG. 21).

Although computer system 1400 is illustrated as a desktop computer in FIG. 14, there can be examples where computer system 1400 can take a different form factor (e.g., a mobile electronic device) while still having functional elements similar to those described for computer system 1400. In some embodiments, computer system 1400 can comprise a single computer, a single server, or a cluster or collection of computers or servers, or a cloud of computers or servers. Typically, a cluster or collection of servers can be used when the demand on computer system 1400 exceeds the reasonable capability of a single server or computer.

Returning back to FIG. 16, communication hub 1601 is also configured to communicate (e.g., wired and/or wireless communication) with at least one audio-visual device 1605. Audio-visual device 1605 can comprise any electronic visual display (e.g., a television, a monitor, etc) and/or image projector. Audio-visual device 1605 can also comprise at least one speaker. When audio-visual device 1605 comprises at least one speaker, the at least one speaker can be part of another audio-visual device of the at least one audio-visual device 1605 (e.g., a television comprising the at least one speaker), can be a stand-alone device, and/or can be part of communication hub 1601 (e.g., when communication hub 1601 comprises the at least one speaker). Communication hub 1601 can be configured to be mechanically and/or electrically coupled with audio-visual device 1605. Accordingly, when communication hub 1601 is in wired communication with audio-visual device 1605, communication hub 1601 can be configured to be coupled to audio-visual device 1605 by at least one audio-visual cable (e.g., a high-definition multimedia interface (HDMI) cable, a digital visual interface (DVI) cable, a display port (DP) cable, a video graphics array (VGA) cable, composite cables, a S-Video cable, an optical audio cable, a universal serial bus (USB) cable, Radio Corporation of America (RCA) cables, a tip-ring-sleeve (TRS) cable such as a 3.5 millimeter TRS cable, etc.). The at least one audio-visual cable can be coupled to communication hub 1601 via digital video converter 161 (FIGS. 1 & 2) (e.g., where the audio-visual cable comprises the HDMI cable, the DVI cable, and/or the DP cable), via analog video converter 162 (FIGS. 1 & 2) (e.g., where the audio-visual cable comprises the VGA cable, the composite cables, the RCA cables, and/or the S-Video cable), and/or via digital audio converter/amplifier 163 (FIGS. 1 & 2) (e.g., where the audio-visual cable comprises the HDMI cable, the optical audio cable, the RCA cables, and/or the TRS cable). In other embodiments, where communication hub 1601 comprises the at least one speaker, the at least one speaker can also be coupled to digital audio converter/amplifier 163 (FIGS. 1 & 2).

Communication hub 1601 can be provided electricity directly (e.g, via an electrical coupling with an electrical receptacle and/or via one or more energy storage devices such as one or more batteries) and/or indirectly (e.g., via the coupling with audio-visual device 1605 such as, for example, a Universal Serial Bus (USB) coupling). When communication hub 1601 is provided electricity via the electrical coupling with the electrical receptacle, communication hub 1601 can comprise an electrical connector (e.g., world-wide voltage input 142 (FIG. 1)) configured to receive an electric cable by which to electrically couple communication hub 1601 to the electrical connector. FIG. 1 provides an exemplary block diagram illustrating circuitry 110 (FIG. 1) of communication hub 1601, according to the embodiment of FIG. 16. Circuitry 110 of communication hub 1601 comprises power supply 140 configured to provide electricity to communication hub 1601 and/or circuitry 110 via the electrical coupling with the electrical receptacle.

Figure 2:
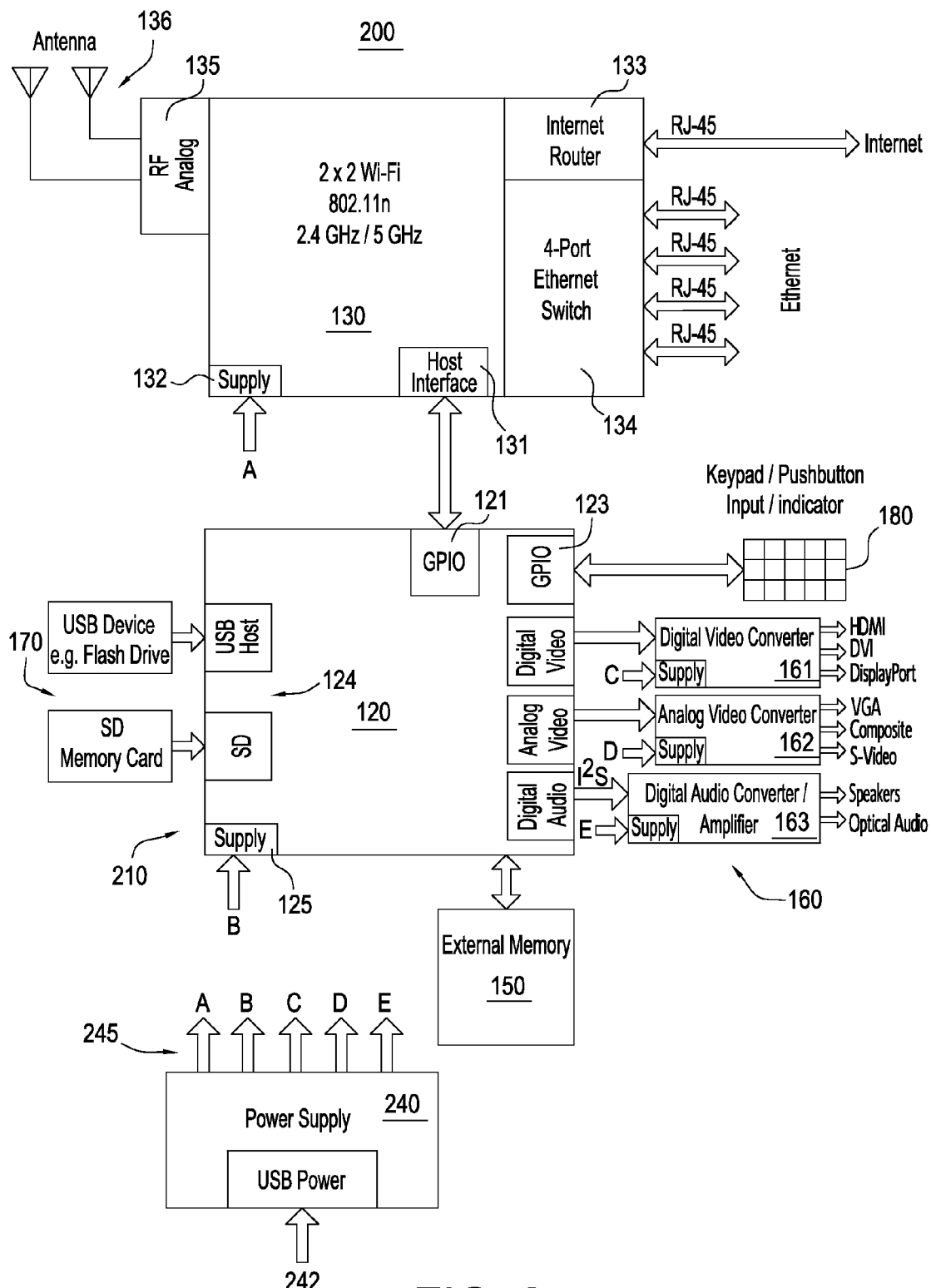
FIG. 2 provides a block diagram illustrating another exemplary circuitry of a communication hub, according to the embodiment of FIG. 16.

Turning now to FIG. 1, communication hub 1601 can comprise processing component 120 (e.g., one or more processing modules), wired/wireless communication component 130, power supply 140, memory 150 (e.g., one or more memory storage modules), interface circuitry 160, interface circuitry 170, and/or interface circuitry 180 (including proprietary/standard connectors). Processing component 120 can be implemented as any suitable multi-media processor, such as, for example Part No. BCM2763 available from Broadcom Corp of San Jose, Calif. Wired/wireless communication component 130 can be implemented as any suitable Wi-Fi/wired communication module, such as, for example, Part No. BRCM5358 (wired and wireless) also available from Broadcom Corp of San Jose, Calif. Power supply 140 can be implemented as any suitable power supply device. Memory 150 can be implemented as any suitable memory device, such as, for example, flash memory. Interface circuitry 160 and 170 can be implemented as any suitable interface circuitry. In some embodiments, interface circuitry 170 can be implemented as one or more of a USB device, a Flash memory device, a secured digital (SD) memory card, and/or the like.

In some embodiments, processing component 120 can comprise general purpose input/output ports (GPIOs) 121 and 123, peripheral interface 124, and power supply input 125. In the same or different embodiments, wired/wireless communication component 130 can comprise GPIO 131 (which can be configured as a host interface, power supply input 132), wide area network (WAN) port 133 (which can be configured as an internet router), local area network (LAN) port(s) 134 (which can be configured as an Ethernet switch (e.g., a 4-port Ethernet switch)), radio frequency (RF) (e.g., analog) front-end circuitry 135, and antenna elements 136. Power supply 140 can comprise alternating current (A/C) power input 142 and direct current (D/C) power outputs 145.

In operation, processing component 120 receives electricity from power supply 140. In some embodiments, power supply 140 can convert electricity having alternating current, as received from an electrical receptacle, to electricity having direct current, suitable to supply electricity to connection hub 11 (FIG. 16) and/or circuitry 110 via D/C power outputs 145. Processing component 120 is in communication with memory 150. Memory 150 includes stored code as well as user data. Memory 150 receives requests from processing component 120 and passes requested instruction code to processing component 120 for execution. Processing component 120 is in two-way communication, via GPIO 121, with GPIO 131 of wired/wireless communication component 130. Communication component 130 facilitates two-way communication between processing component 120 (as a client) and an existing network via an access point. Communication component 130 also facilitates two-way communication between processing component 120 (as a client) and any number of multiple electronic devices 1602 (FIG. 16) that are attempting to become members of a connected users group, as described below. In some embodiments, communication component 130 facilitates two-way communication between processing component 120 (as a client) and an existing network via an access point, such as, for example via WAN port 133. In other embodiments, communication component 130 also facilitates two-way communication between processing component 120 (as a client) and any number of multiple electronic devices 1602 (FIG. 16) that are attempting to become members of the connected users group, such as, for example via LAN port(s) 134 and/or RF front-end circuitry 135 and antenna elements 136.

Meanwhile, interface circuitry 160 comprises digital video converter 161, analog video converter 162, and/or digital audio converter/amplifier 163, as described above. Accordingly, in some embodiments, interface circuitry 160 can be configured to receive audio-visual data comprising analog/digital video data from any of multiple electronic devices 1602 (FIG. 16), can condition/convert the analog/digital video data, and can pass the conditioned/converted video data to audio-visual device 1605 (FIG. 16) (e.g., where audio-visual device 1605 comprises the electronic visual display and/or the image projector) via the at least one audio-visual cable (e.g., the HDMI cable, the DVI cable, the DP cable, the VGA cable, the composite cables, and/or the S-Video cable) and/or via wireless communication (e.g., wired/wireless communication component 130 using integrated wireless access point 901 (FIG. 9), wired network connection 1001 (FIG. 10), and/or external wireless network connection 1101 (FIGS. 11 & 12). In the same or different embodiments, interface circuitry 160 can be configured to receive audio-visual data comprising digital audio data from any of multiple electronic devices 1602 (FIG. 16), can condition/convert the received audio data, and can pass the conditioned/converted audio data to one or more audio devices to audio-visual device 1605 (FIG. 16) (e.g., where audio-visual device 1605 comprises the at least one speaker) via the at least one audio-visual cable (e.g., the HDMI cable, the optical audio cable, the RCA cables, and/or the TRS cable) and/or via wireless communication (e.g., wired/wireless communication component 130 using integrated wireless access point 901 (FIG. 9), wired network connection 1001 (FIG. 10), and/or external wireless network connection 1101 (FIGS. 11 & 12). For example, digital video converter 161 can receive digital video data from one electronic device (e.g., the active electronic device, as described below) of multiple electronic devices 1602 (FIG. 16), can condition/convert the received digital video data, and can pass the conditioned/converted digital video data to audio-visual device 1605 (FIG. 16) via the at least one audio-visual cable. In another example, analog video converter 162 can receive analog video data from one electronic device (e.g., the active electronic device, as described below) of multiple electronic devices 1602 (FIG. 16), can condition/convert the received analog video data, and can pass the conditioned/converted analog video data to audio-visual device 1605 (FIG. 16) via the at least one audio-visual cable. In yet another example, digital audio converter 163 can receive digital audio data from one electronic device (e.g., the active electronic device, as described below) of multiple electronic devices 1602 (FIG. 16), can condition/convert the received digital audio data (e.g., converts to an I²S data format), and can pass the conditioned/converted digital audio data to audio-visual device 1605 (FIG. 16) via the at least one audio-visual cable. As described above, in these embodiments, audio-visual device 1605 (FIG. 16) can be part of connection hub 11 (FIG. 16), another audio-visual device, or a stand-alone device.

Next, interface circuitry 170 can be configured to facilitate communication between communication hub 1601 (FIG. 16) and external devices (e.g., storage devices) via one or more interface standards (e.g., USB, Secured Digital (SD), etc.) for multiple functions, such as, for example providing external storage, firmware updates, system diagnostics, and the like to connection hub 11 (FIG. 16) and/or circuitry 110. Meanwhile, interface circuitry 180 can be configured to facilitate communication between communication hub 1601 (FIG. 16) and user(s) 1606 (FIG. 16), from communication hub 1601 to user(s) 1606. In these embodiments, interface circuitry 180 facilitates one-way communication between communication hub 1601 (FIG. 16) and user(s) 1606 (FIG. 16), such as, for example, electric power status, connection status (e.g., link quality), connected users group data (e.g., identify the user of the active electronic device, identify passive users, etc.) as described below, and the like. In other embodiments, interface circuitry 180 can be configured to facilitate communication between connection hub 11 (FIG. 16) and user(s) 1606 (FIG. 16), from the user(s) 1606 to communication hub 1601. In these embodiments, interface circuitry 180 facilitates one-way communication between user(s) 1606 (FIG. 16) and communication hub 1601 (FIG. 16), such as, for example, unit configuration, active electronic device selection, network connection authentication information, and the like. In still other embodiments, interface circuitry 180 can be configured to facilitate two-way communication between communication hub 1601 (FIG. 16) and user(s) 1606 (FIG. 16), such as, for example the aforementioned one-way communication listings, pass code interaction (i.e., provide unique identification when multiple communication hubs comprising communication hub 1601 are available), additional control functionality (i.e., assigning a new active electronic device), and the like.

FIG. 2 provides another exemplary block diagram illustrating circuitry 210 (FIG. 2) of communication hub 1601 (FIG. 16), according to the embodiment of FIG. 16. Circuitry 210 (FIG. 2) is similar to circuitry 110 (FIG. 1), but comprises power supply 240 (FIG. 2) configured to provide electricity to communication hub 1601 (FIG. 16) and/or circuitry 210 (FIG. 2) via the coupling with audio-visual device 1605 (FIG. 16). In some embodiments, power supply 240 can comprise power input 242 and D/C power outputs 245. Power input 242 can be in electrical communication with various energy sources, such as, for example a USB charging device, a host computing device or projection device having a USB port capable of supplying sufficient power to the communication hub 1601 (FIG. 16). In other embodiments, power input 242 can be in electrical communication with any suitable energy source. Accordingly, in these embodiments, audio-visual device 1605 (FIG. 16) can either have its own energy storage device(s) and/or can be configured to draw electricity from an electrical receptacle.

Figure 4:
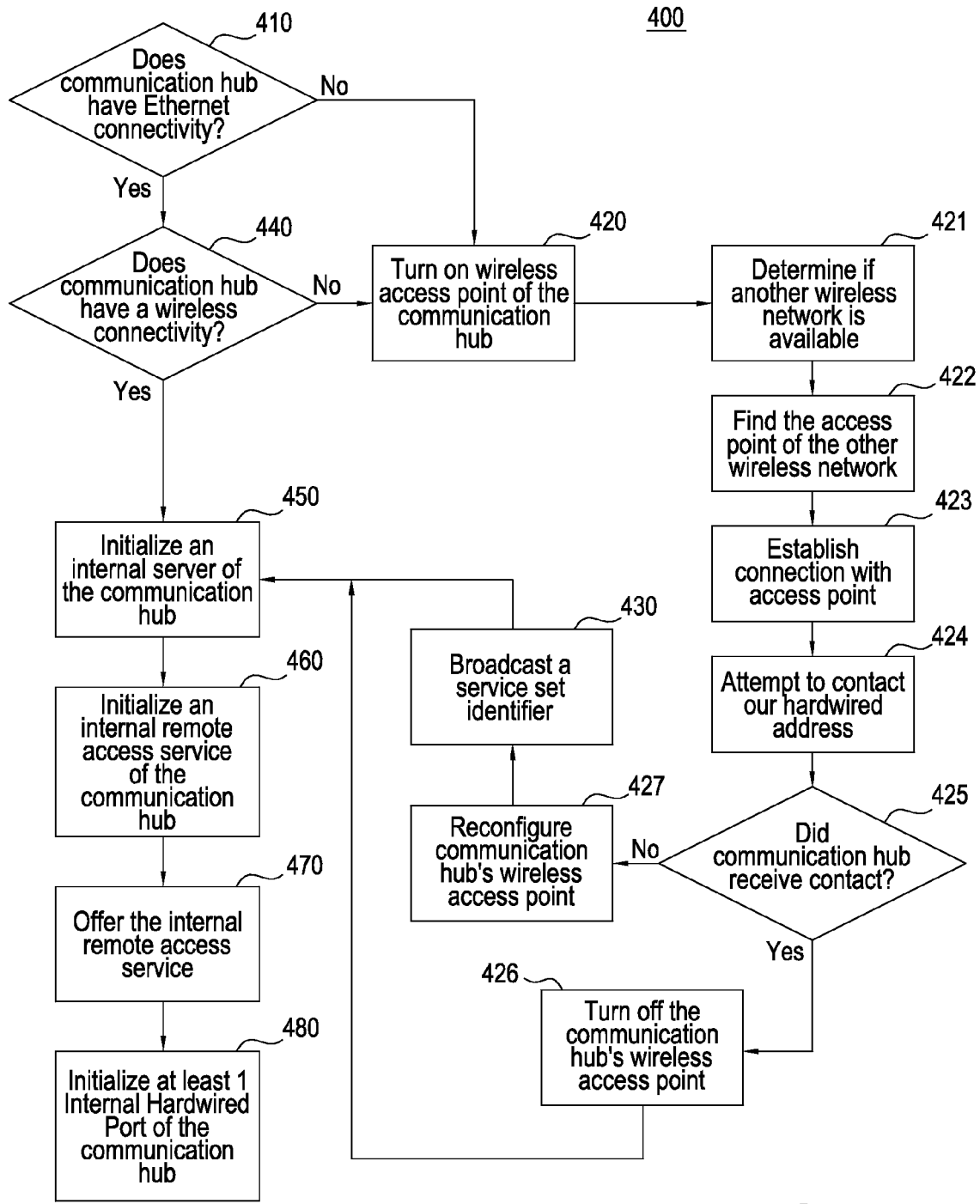
FIG. 4 illustrates an exemplary embodiment of a method of pairing an electronic device with a communication hub.

Returning again to FIG. 16, in operation, communication hub 1601 can be configured such that when communication hub 1601 is communicating with multiple electronic devices 1602, multiple electronic devices 1602 can comprise first electronic device 1603, operating as an active electronic device, and at least one other electronic device 1604. As described below, FIG. 4 illustrates an exemplary embodiment of method 400 of pairing an electronic device with a communication hub. The active electronic device can be configured to control communication hub 1601 by providing command data (e.g., computer instructions) to communication hub 1601. Meanwhile, communication hub 1601 can be configured to receive audio-visual data from the active electronic device when the active electronic device is controlling communication hub 1601 and/or to provide the audio-visual data to audio-visual device 1605 when communication hub 1601 receives the audio-visual data from the active electronic device. In some embodiments, the active electronic device can be configured to provide the command data and/or the audio-visual data to communication hub 1601 in the same or different data channels and/or the same or different data streams. Likewise, communication hub 1601 can be configured to provide the audio-visual data in the same or different data channels and/or in the same or different data streams. For example, the active electronic device can be configured to provide both the command data and the audio-visual data to communication hub 1601 via integrated wireless access point 901 (FIG. 9). Accordingly, the active electronic device can provide both the command data and the audio-visual data to communication hub 1601 in the same wireless channel. However, the active electronic device can provide the command data in a first data stream and can provide the audio-visual data in a second data stream. Meanwhile, communication hub 1601 can then provide the audio-visual data to audio-visual device 1605 also via integrated wireless access point 901 (FIG. 9). However, communication hub 1601 can provide audio data of the audio-visual data via a first data channel and video data of the audio-visual data via a second data channel. Alternatively, in the same example, communication hub 1601 could provide both the audio data and the video data of the audio-visual data to audio-visual device 1605 via a single wired data channel (e.g., the at least one audio-visual cable) in the same audio-visual data stream or in separate audio-visual data streams.

Figure 6:
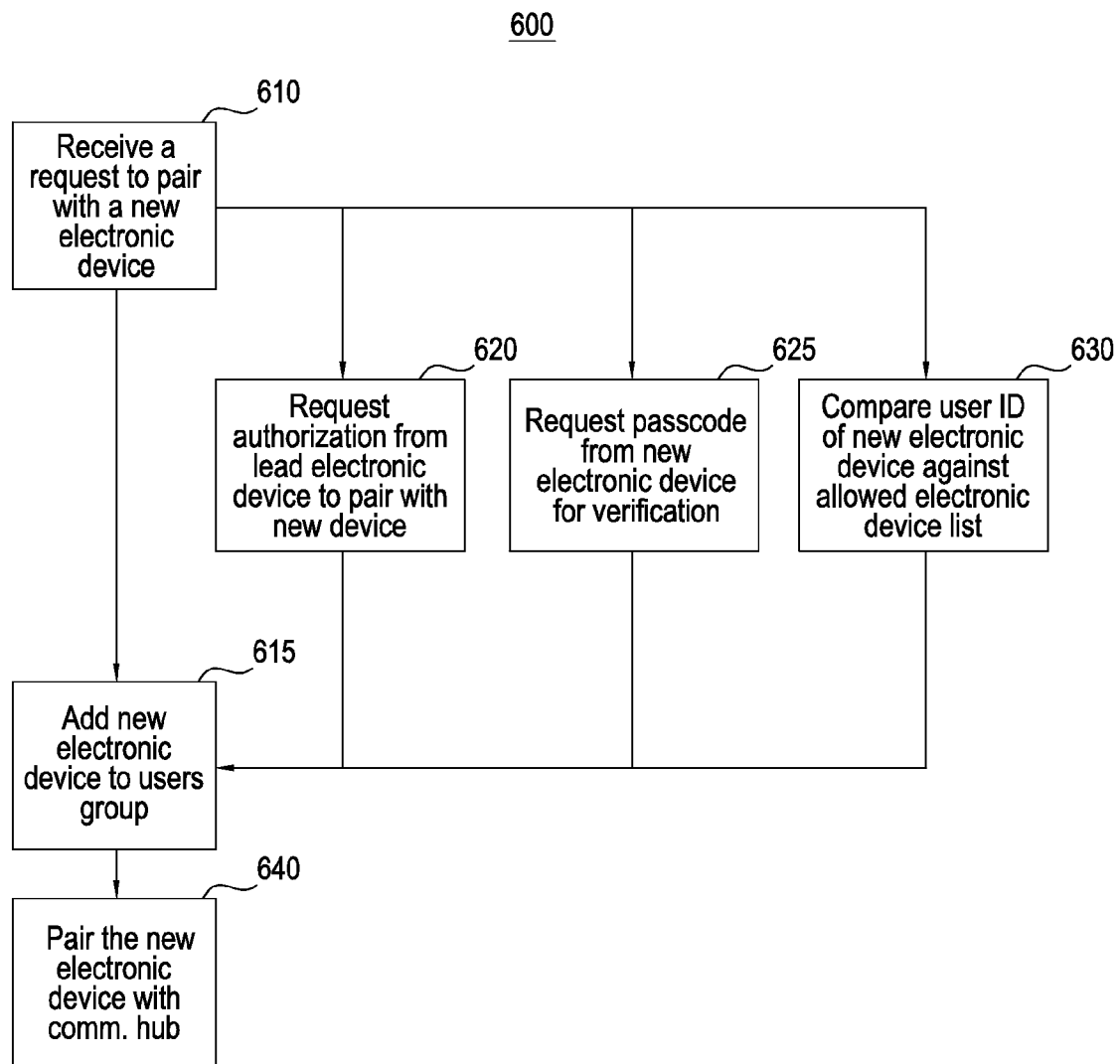
FIG. 6 illustrates an exemplary embodiment of a method of adding a new electronic device of multiple electronic devices to a connected users group.
Figure 7:
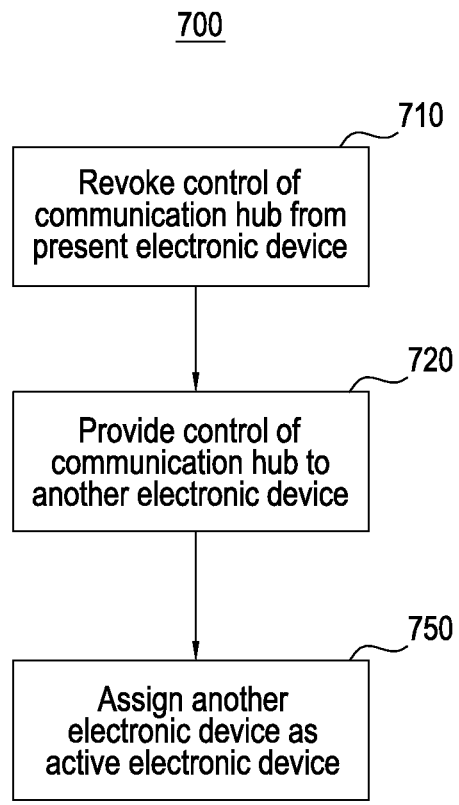
FIG. 7 illustrates an exemplary embodiment of a method of passing control of a communication hub from one electronic device to another electronic device of multiple electronic devices.
Figure 18:
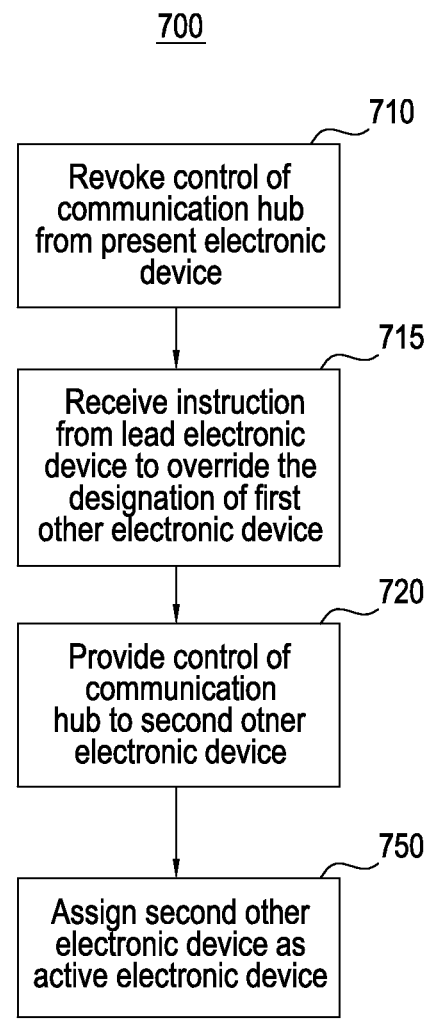
FIG. 18 illustrates another exemplary embodiment of the method of FIG. 7 of passing control of the communication hub from one electronic device to another electronic device of multiple electronic devices.

The active electronic device and the at least one other electronic device 1604 can form a connected users group that is maintained by communication hub 1601 when multiple electronic devices 1602 are paired (e.g., in communication) with communication hub 1601. As described previously above, the active electronic device can control communication hub 1601 (e.g., can control communication hub 1601 providing the audio-visual data to audio-visual device 1605). Meanwhile, communication hub 1601 can be configured such that when the active electronic device is controlling communication hub 1601, the active electronic device can pass control of communication hub 1601 to any one other electronic device of at least one other electronic device 1604. When the active electronic device passes control of communication hub 1601 to any other electronic device of at least one other electronic device 1604, the any other electronic device takes over operating as the active electronic device. As described below, FIGS. 7 and 18 illustrate exemplary embodiments of method 700 of passing control of a communication hub from one electronic device to another electronic device of multiple electronic devices. In various embodiments, communication hub 1601 maintains periodic communication with each electronic device of multiple electronic devices 1602 while continuously communicating with the active electronic device of multiple electronic devices 1602. Accordingly, communication hub 1601 can determine whether certain electronic devices of multiple electronic devices 1602 have disconnected from communication hub 1601 and/or the connected users group and/or to determine if new electronic devices of multiple electronic devices 1602 have requested to join the connected users group. As described below, FIG. 6 illustrates an exemplary embodiment of method 600 of adding a new electronic device of multiple electronic devices to a connected users group.

In various embodiments, one electronic device of multiple electronic devices 1602 can be operating as a lead electronic device. The lead electronic device can be similar or identical to the active electronic device, but can be further configured to override the active electronic device and/or to take over operation as the active electronic device. When the lead electronic device takes over as the active electronic device, the lead electronic device can operate as the active electronic device until another electronic device of multiple electronic devices 112 is designated (e.g., by the lead electronic device) to be the active electronic device. In this manner, the lead electronic device can select a new active electronic device, as described below with respect to FIG. 18. In many embodiments, when the lead electronic device assigns the new active electronic device, the lead electronic device can still remain operating as the lead electronic device. Further, the lead electronic device can also provide a pass code required to be provided by any of the other electronic devices of multiple electronic devices 1602 in order to (a) pair with communication hub 1601 and/or (b) determine an allowed user list on which each of multiple electronic devices 1602 can need to be listed in order to be paired with communication hub 1601, each of which is described in further detail below with respect to FIG. 17. Implementing system 1600 with a lead electronic device can permit enhanced privacy and/or confidentiality by providing security to system 1600. System 1600 can also and/or additionally be secured in any other suitable and/or conventional manner by which to secure electronic communications.

Figure 5:
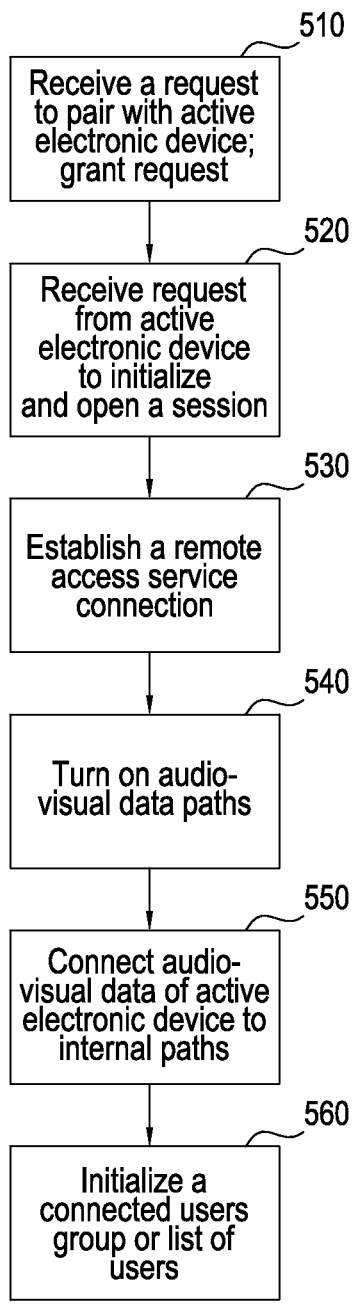
FIG. 5 illustrates an exemplary embodiment of a method of assigning an active electronic device of multiple electronic devices.
Figure 17:
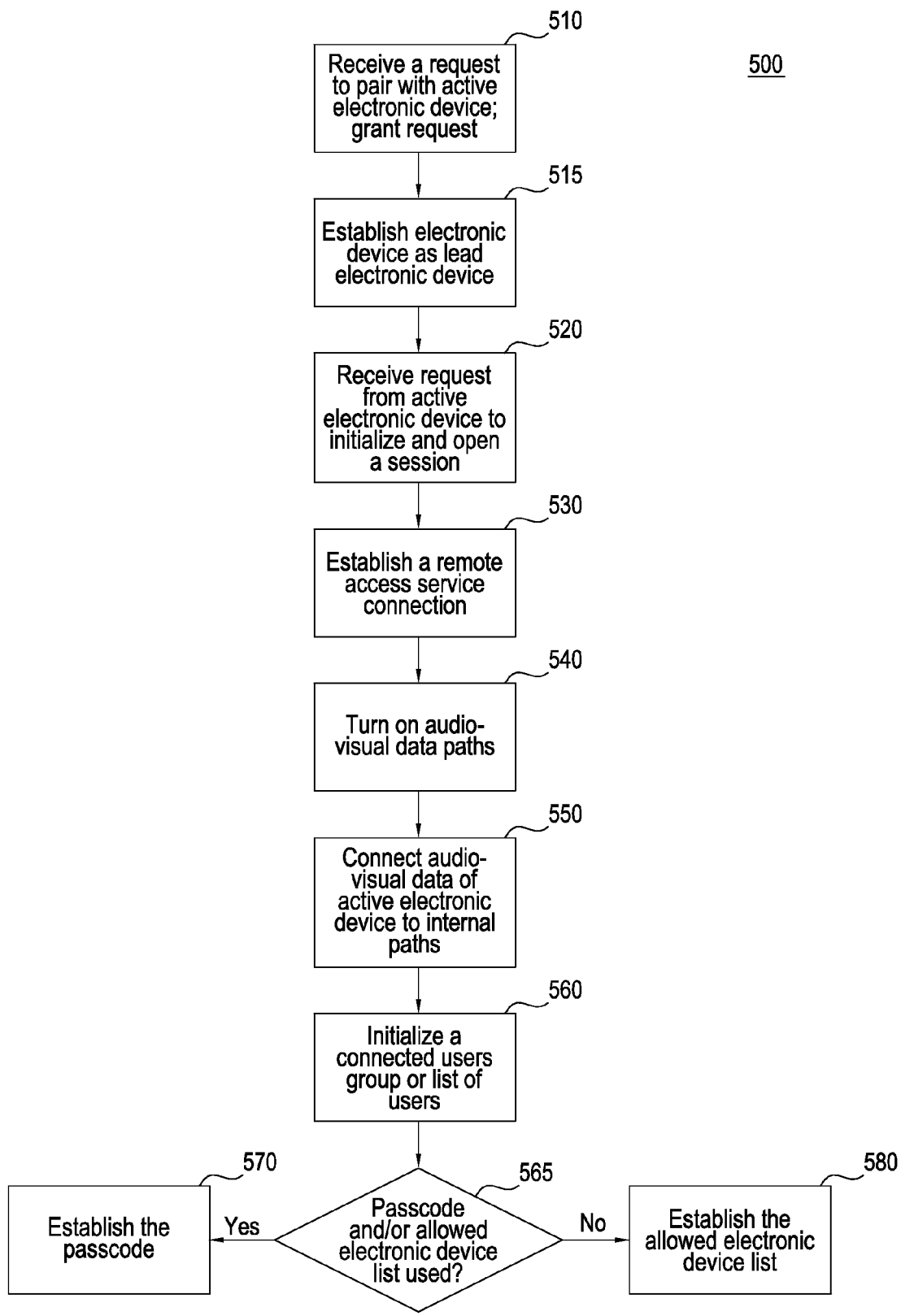
FIG. 17 illustrates another exemplary embodiment of the method of FIG. 5 of assigning the active electronic device of multiple electronic devices.

In some embodiments, the first electronic device (e.g. first electronic device 1603) of multiple electronic devices 1602 to pair with communication hub 1601 can become the initial active electronic device and/or the lead electronic device. In other embodiments, communication hub 1601 and/or the lead electronic device can determine which electronic device of multiple electronic devices 1602 to assign as the active electronic device based on a pre-populated priority user list (e.g., an electronic device of multiple electronic devices 1602 ranked highest on the pre-populated priority user list). In the same or different embodiments, the lead electronic device can designate for communication hub 1601 which electronic device of multiple electronic devices 1602 to assign as the active electronic device, such as where the lead electronic device established the pre-populated priority user list. As described below, FIGS. 5 and 17 illustrate exemplary embodiments of method 500 of assigning an active electronic device of multiple electronic devices.

Figure 8:
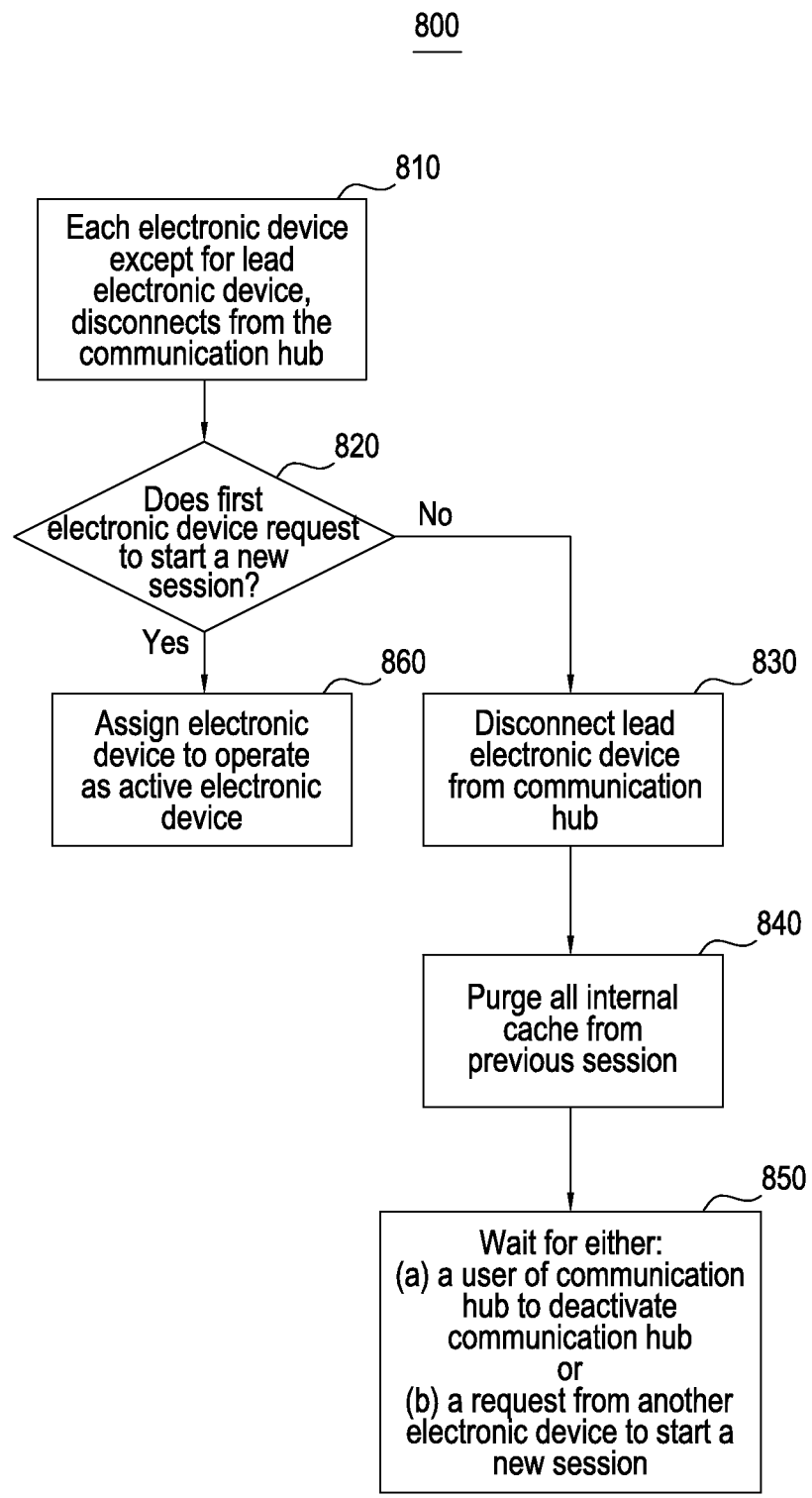
FIG. 8 illustrates an exemplary embodiment of a method of terminating a session with a communication hub.

Audio-visual device 1605 can be configured to present the audio-visual data (e.g., to user(s) 1606 of communication hub 1601) when audio-visual device 1605 receives the audio-visual data from communication hub 1601 that is provided to communication hub 1601 by the active electronic device. When user(s) 1606 are finished using system 1600, user(s) 1606 can terminate their session with communication hub 1601. When each of user(s) 1606 terminate the session with communication hub 1601, the session can end. Meanwhile, as described below, FIG. 8 illustrates another exemplary embodiment of method 800 of terminating a session with a communication hub, where system 1600 is being implemented with one of the electronic devices of multiple electronic devices 1602 operating as a lead electronic device, as described above. In these embodiments, the lead electronic device can determine when the session with communication hub 1601 terminates.

Figure 3:
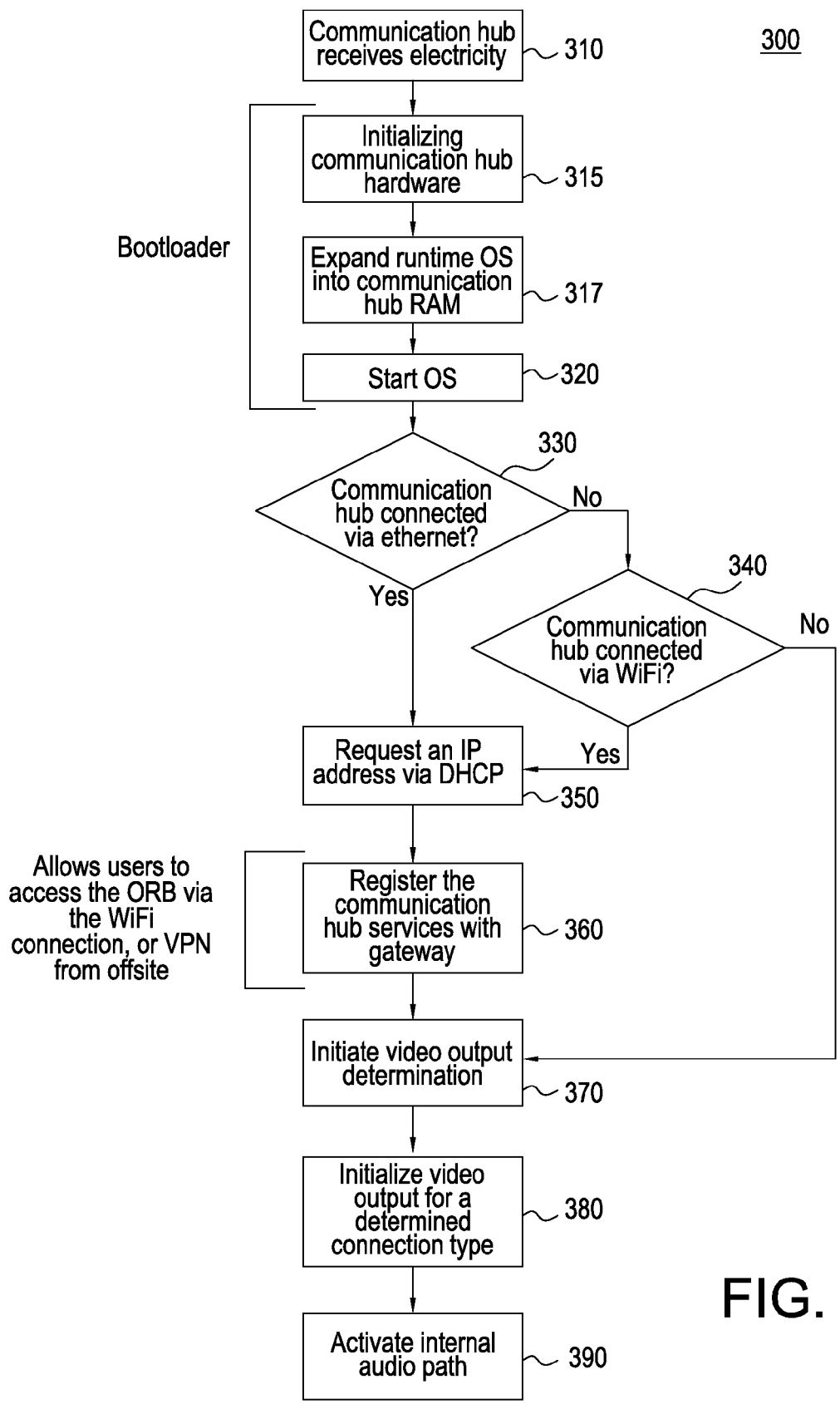
FIG. 3 illustrates a flow chart for an exemplary embodiment of a method of starting-up a system configured to permit presentation of audio-visual data from multiple electronic devices.

Turning back to earlier drawings, FIG. 3 illustrates a flow chart for an exemplary embodiment of method 300 of starting-up a system configured to permit presentation of audio-visual data from multiple electronic devices. Method 300 is merely exemplary and is not limited to the embodiments presented herein. Method 300 can be employed in many different embodiments or examples not specifically depicted or described herein. In some embodiments, the procedures, the processes, and/or the activities of method 300 can be performed in the order presented. In other embodiments, the procedures, the processes, and/or the activities of the method 300 can be performed in any other suitable order. In still other embodiments, one or more of the procedures, the processes, and/or the activities in method 300 can be combined or skipped. The system can be similar or identical to system 1600 (FIGS. 9-12, 16) and/or the multiple electronic devices can be similar or identical to multiple electronic devices 1602 (FIGS. 9-12, 16).

Method 300 can comprise procedure 310 of receiving electricity at a communication hub. The communication hub can be similar or identical to communication hub 1601 (FIG. 16). Method 300 can continue with procedure 315 of initializing hardware (e.g., circuitry 110 (FIG. 1), circuitry 210 (FIG. 2), etc.) of the communication hub, procedure 317 of expanding a runtime operating system (OS) of the communication hub 1601 into random access memory (RAM) of the communication hub, if applicable, and procedure 320 of starting the OS. In some embodiments, procedures 315, 317, and 320 can be implemented as a boot loader functionality.

Method 300 can comprise procedure 330 of determining whether the communication hub has Ethernet network connectivity. Method 300 can also comprise procedure 340 of determining whether the communication hub has wireless network connectivity. Procedure 330 can be performed and/or can occur before procedure 340 or vice versa. If after performing procedure 330 and/or procedure 340, Ethernet network connectivity and/or wireless network connectivity is located, then method 300 can comprise procedure 350 of requesting an internet protocol (IP) address and/or procedure 360 of registering the communication hub with a services gateway. Performing procedure 350 can permit the multiple electronic devices to communicate with the communication hub via the wireless network connection and/or a virtual private network (VPN) connection, according to method 400 (FIG. 4), as described below. If procedure 330 and procedure 340 do not locate Ethernet network connectivity and/or wireless network connectivity, procedure 350 and procedure 360 can be omitted. Procedures 330, 340, 350, and 360 can be performed and/or can occur after procedure 310, 315, 317, and/or 320.

Next, method 300 can comprise procedure 370 of initiating video output determination (e.g., auto-sensing), procedure 380 of initializing video output for a determined connection type, and/or procedure 390 of activating an internal audio path. Procedures 370, 380, and/or 390 can be performed and/or can occur after procedures 310, 315, 317, 320, 330, 340, 350, and/or 360.

Turning to the next figure, FIG. 4 illustrates a flow chart for an exemplary embodiment of method 400 of pairing an electronic device with a communication hub. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of the method 400 can be performed in any other suitable order. In still other embodiments, one or more of the procedures, the processes, and/or the activities in method 400 can be combined or skipped. The electronic device can be similar or identical to any electronic device of multiple electronic devices 1602 (FIG. 16) and/or the communication hub can be similar or identical to communication hub 1601 (FIG. 16).

Method 400 can comprise procedure 410 of determining whether a communication hub has Ethernet network connectivity and/or procedure 440 of determining whether the communication hub has wireless network connectivity. Procedure 410 can be similar or identical to procedure 330 (FIG. 3) and/or procedure 440 can be similar or identical to procedure 340 (FIG. 3).

If after performing procedure 410 and/or procedure 440, Ethernet network connectivity and/or wireless network connectivity is not located, then method 400 can comprise procedure 420 of turning on a wireless access point of the communication hub. The wireless access point can be similar or identical to integrated wireless access point 901 (FIG. 9). In the same or different embodiments, method 400 can comprise procedure 421 of determining if another wireless network connection is available, procedure 422 of finding an access point of the another wireless network connection, procedure 423 of establishing a connection between the communication hub and the access point of the other wireless network connection, procedure 424 of contacting a hardwired address, and/or procedure 425 of determining if the communication hub receives communication (e.g., via the other wireless network connection) after contacting the hardwired address. If after performing procedure 425, the communication hub receives the communication after contacting the hardwired address, method 400 can continue with procedure 426 of turning off the wireless access point of the communication hub. If after performing procedure 425, the communication hub does not receive the communication after contacting the hardwired address, method 400 can continue with procedure 427 of reconfiguring the wireless access point of the communication hub and/or procedure 430 of broadcasting a service set identifier (SSID). In some embodiments, the wireless access point can be provided and/or the SSID can be broadcasted via wireless antenna(s) 136 (FIGS. 1 & 2).

In some embodiments, if after performing procedure 410 and/or procedure 440, Ethernet network connectivity and/or wireless network connectivity is not located, procedures 420-427 and 430 can be performed, and communication hub 1601 can be implemented according to as shown in FIGS. 9, 10, 11, and/or 12 as applicable.

Method 400 can comprise procedure 450 of initializing an internal server of the communication hub, procedure 460 of initializing an internal remote access service of the communication hub, procedure 470 of offering the internal remote access service, and/or procedure 480 of initializing at least one internal hardwired port of the communication hub (e.g., four internal hardwired ports of the communication hub). Procedure 480 can comprise a process of establishing logical connection between the services detailed in procedures 450, 460, and/or 470 with the internal hardwired port(s) of procedure 480. Each of the internal hardwired port(s) can be similar or identical to any port of LAN port(s) 134 (FIGS. 1 & 2). Procedures 450, 460, 670, and 480 can be performed after procedures 410 and 440 locate Ethernet and/or wireless network connectivity, after procedure 430, and/or after procedure 426.

Turning again to the next figure, FIG. 5 illustrates a flow chart for an exemplary embodiment of method 500 of assigning an active electronic device of multiple electronic devices. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of the method 500 can be performed in any other suitable order. In still other embodiments, one or more of the procedures, the processes, and/or the activities in method 500 can be combined or skipped. The active electronic device can be similar or identical to the active electronic device described above with respect to system 1600 (FIGS. 9-12, 16. The multiple electronic devices can be similar or identical to multiple electronic devices 1602 (FIG. 16).

Method 500 can comprise procedure 510 of receiving a request to pair the active electronic device to a communication hub and pairing the active electronic device with the communication hub. The communication hub can be similar or identical to communication hub 1601 (FIG. 16). Meanwhile, after procedure 510, method 500 can continue with procedure 520 of receiving a request that a session be initialized and opened from the active electronic device. Method 500 can comprise procedure 530 of establishing a remote access service connection, procedure 540 of turning on audio-visual data paths, procedure 550 of connecting audio-visual data of the active electronic device to the audio-visual data paths, and/or procedure 560 of initializing a connected users group or a list of users. The connected users group can be similar or identical to the connected users group described above with respect to system 1600 (FIGS. 9-12, 16). Procedure 540 and procedure 550 can comprise receiving the audio-visual data at interface circuitry of the communication hub The interface circuitry can be similar or identical to interface circuitry 160 (FIGS. 1 & 2). Procedure 560 can comprise a process of adding the active electronic device to the top of the connected users group.

In various embodiments, and as illustrated in FIG. 5, method 500 can be implemented without security. As a result, in these embodiments, any electronic device can join the connected users group and/or pair with the communication hub. While this implementation can permit for easy setup and administration, it can also limit privacy and therefore, confidentiality. Accordingly, in other embodiments, and as illustrated in FIG. 17, method 500 can also be implemented with security.

Turning now to FIG. 17, when method 500 is securely implemented, method 500 can still comprise one or more of procedures 510, 520, 530, 540, 550, and/or 560. Meanwhile, in various embodiments, method 500 can also comprise procedure 515 of establishing an electronic device as a lead electronic device. Performing procedure 515 can be similar to performing procedure 510 but for the lead electronic device. When the lead electronic device is the active electronic device, as described below, procedure 510 and procedure 515 can be implemented as the same procedure instead of separate procedures. In some embodiments, procedure 515 can be performed simultaneously with or after procedure 510 and/or before procedure 520. In many embodiments, the lead electronic device is statically assigned as opposed to the active electronic device, which is dynamically assigned. The initial active electronic device assigned according to procedure 510 can also be the lead electronic device. In other embodiments, the lead electronic device can be any other electronic device, and in further embodiments, can never operate as the active electronic device at any point during the session requested according to procedure 530.

The lead electronic device can be similar or identical to the active electronic device with the added functionality of being able to override the active electronic device where the lead electronic device and the active electronic device are not one and the same. As a result, the lead electronic device has ultimate and/or independent control over the communication hub and/or any sessions requested according to procedure 530, thereby securely implementing method 500.

When being securely implemented, method 500 can further comprise procedure 565 after procedure 560. Procedure 565 can include requesting whether the lead electronic device wants to establish a pass code and/or an allowed user list. If the lead electronic device wants to establish the pass code, method 500 can comprise optional procedure 570 of establishing the pass code, where the pass code is required to be provided in order to pair any electronic device with the communication hub. In these embodiments, the lead electronic device can provide the pass code, and procedure 570 can comprise a process of receiving the pass code from the lead electronic device. In the same or different embodiments, if the lead electronic device wants to establish the allowed user list, method 500 can also comprise optional procedure 580 of establishing the allowed electronic device list (e.g., a list of those devices that can join the connected users group and pair with the communication hub). In these embodiments, the lead electronic device can provide the allowed electronic device list, and procedure 580 can comprise a process of receiving the allowed electronic device list from the lead electronic device. When method 500 comprises procedure 570, additional electronic devices can provide the pass code to pair with the communication hub. When method 500 comprises procedure 580, additional electronic devices can be required to be listed in the allowed electronic device list to pair with the communication hub. Performing procedure 570 and/or procedure 580 can provide additional security to method 500. Method 500 can also be further secured according to any of various other suitable and/or conventional approaches for securing electrical communication.

Turning back in the drawings, FIG. 6 illustrates a flow chart for an exemplary embodiment of method 600 of adding a new electronic device of multiple electronic devices to a connected users group. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of the method 600 can be performed in any other suitable order. In still other embodiments, one or more of the procedures, the processes, and/or the activities in method 600 can be combined or skipped. The multiple electronic devices and/or the new electronic devices can be similar or identical to multiple electronic devices 1602 (FIG. 16). The connected users group can be similar or identical to the connected users group described above with respect to system 1600 (FIGS. 9-12, 16).

Referring now to FIG. 6, method 600 can comprise procedure 610 of receiving a request to pair the new electronic device of the multiple electronic devices with a communication hub. The communication hub can be similar or identical to communication hub 1601 (FIG. 16).

Method 600 also can comprise procedure 615 of adding the new electronic device of the multiple electronic devices to the connected users group.

Referring again to FIG. 6, after procedure 610, method 600 can continue with optional procedure 620 of requesting authorization from a lead electronic device of the multiple electronic devices to pair the new electronic device of the multiple electronic devices with the communication hub. The lead electronic device can be similar or identical to the lead electronic device described above with respect to system 1600 (FIGS. 9-12, 16). After procedure 610, method 600 can alternatively continue with optional procedure 625 of providing a pass code request to the new electronic device for verification (e.g., where procedure 570 has been performed) and/or optional procedure 630 of comparing a user identification of the new electronic device against allowed user identifications of an allowed electronic device list (e.g., where procedure 580 (FIG. 5) has been performed). Accordingly, procedure 625 can comprise a process of receiving the pass code from the new electronic device, and/or procedure 630 can comprise a process of recognizing the user identification of the new electronic device as an allowed user identification of the allowed electronic device list. With respect to procedure 620, if the active electronic device approves the new electronic device, the new electronic device is affirmed and permitted to pair with communication hub 1601 (FIG. 16). If the active electronic device does not approve the new electronic device, the new electronic device is not permitted to pair with communication hub 1601 (FIG. 16). With respect to procedure 625, if the active electronic device provides the correct pass code, the new electronic device is affirmed and permitted to pair with communication hub 1601 (FIG. 16). If the active electronic device does not approve the new electronic device, the new electronic device is not permitted to pair with communication hub 1601 (FIG. 16). With respect to procedure 630, if the new electronic device is on the allowed electronic device list, the new electronic device is affirmed and permitted to pair with communication hub 1601 (FIG. 16). If the active electronic device is not on the allowed electronic device list, the new electronic device is not permitted to pair with communication hub 1601 (FIG. 16). Where method 600 comprises one or more of procedures 620, 625, and/or 630, procedure 615 can be performed after procedures 620, 625, and/or 630, as applicable. Also, method 600 can comprise procedures 620, 625, and/or 630 where method 500 has been implemented with security. If method 500 has been implemented without security, procedures 620, 625, and/or 630 can be omitted, as applicable.

In some embodiments, method 600 can conclude with procedure 640 of pairing the new electronic device with the communication hub.

Turning ahead in the figures, FIG. 7 illustrates a flow chart for an exemplary embodiment of method 700 of passing control of a communication hub from one electronic device to another electronic device of multiple electronic devices. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of the method 700 can be performed in any other suitable order. In still other embodiments, one or more of the procedures, the processes, and/or the activities in method 700 can be combined or skipped. The communication hub can be similar or identical to communication hub 1601 (FIG. 16). The multiple electronic devices can be similar or identical to multiple electronic devices 1602 (FIG. 16). The one electronic device can comprise an active electronic device. The active electronic device can be similar or identical to the active electronic device described above with respect to system 1600 (FIGS. 9-12, 16).

Method 700 can comprise procedure 710 of revoking control of the communication hub from a present active electronic device. Procedure 710 can comprise a process of identifying another electronic device to become a new active electronic device. In some embodiments, identifying another electronic device to become the new active electronic device can comprise receiving a designation of another electronic device to become the new active electronic device from the present active electronic device (e.g., the first electronic device and/or a lead electronic device). In other embodiments, identifying another electronic device to become the new active electronic device can comprise designating a lead electronic device as the other electronic device to become the new active electronic device, as described in further detail below. In these embodiments, the lead electronic device can be a different electronic device than the active electronic device, as is also described in further detail below. The lead electronic device can be similar or identical to the lead electronic device described above with respect to system 1600 (FIGS. 9-12, 16). Procedure 710 can also comprise a process of causing the present active electronic device (e.g., the first electronic device) to discontinue providing audio-visual data and/or command data to the communication hub.

After procedure 710, method 700 can continue with procedure 720 of providing control of the communication hub to another electronic device (e.g., the second electronic device and/or the lead electronic device, as determined by the present active electronic device and/or the lead electronic device, as applicable). Procedure 720 can also comprise a process of causing the other electronic device (e.g., the second electronic device and/or the lead electronic device) to begin providing audio-visual data and/or command data to the communication hub. Method 700 can comprise procedure 750 of assigning the other electronic device to operate as the active electronic device. If necessary, procedure 720 can also comprise a process of updating the connected user group and/or the allowed user list.

In a similar manner to that of method 500 (FIG. 5) and as illustrated in FIG. 7, in various embodiments, method 700 can be implemented without security. Also, as equivalently illustrated in FIG. 18, in other embodiments, method 700 can also be implemented with security, such as where method 500 has previously been implemented with security. Where method 700 is implemented with security, there can presently be a lead electronic device, and the lead electronic device can be a different electronic device than the active electronic device. In these embodiments, method 700 can still comprise one or more of procedures 710, 720, and/or 750 and can further comprise optional procedure 715 of receiving an instruction from the lead electronic device to override the designation of another electronic device to become the new active electronic device, where the present active electronic device provided the designation of the other electronic device. Performing procedure 715 does not necessarily require that the present active electronic device actually designate the other electronic device. Indeed, procedure 715 can be performed at any time to cause the lead electronic device to become the active electronic device, even where the lead electronic device is not actively blocking the designation of the other electronic device. Accordingly, where method 700 comprises procedure 715, the process of identifying another electronic device, of which procedure 710 is comprised, can comprise designating the lead electronic device as the other electronic device to become the new active electronic device, as described above.

Referencing FIGS. 7 and 18, after performing procedure 750, method 700 can be repeated (starting at procedure 710) for any other electronic devices of the multiple electronic devices. Where method 700 is implemented with security and comprises procedure 715, method 700 can simply be repeated in the manner illustrated in FIG. 7 as the lead electronic device would then be operating as both the lead electronic device and the active electronic device such that there would no longer be a different electronic device (e.g., operating as the lead electronic device) from which to receive an override of the other electronic device identified to become the new active electronic device. Although method 700 would then be performed in accordance with FIG. 7, method 700 would still be considered to be implemented with security in such an example.

Turning to another one of the drawings, FIG. 8 illustrates a flow chart for an exemplary embodiment of method 800 of terminating a session with a communication hub. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any other suitable order. In still other embodiments, one or more of the procedures, the processes, and/or the activities in method 800 can be combined or skipped. Method 800 can be performed where methods 500, 600, and/or 700 are implemented with security. Specifically, method 800 can be performed where one electronic device of multiple electronic devices in communication with the communication hub is operating as a lead electronic device. The multiple electronic devices can be similar or identical to multiple electronic devices 1602 (FIG. 16) and/or the lead electronic device can be similar or identical to the lead electronic device described above with respect to system 1600 (FIGS. 9-12, 16). In other embodiments, where methods 500, 600, and/or 700 are implemented without security, and/or where none of the multiple electronic devices is operating as the lead electronic device, the session with the communication hub can simply terminate when all of the multiple electronic devices are disconnected from the communication hub.

Referring now to FIG. 8, method 800 can comprise procedure 810 of disconnecting from the communication hub each electronic device of multiple electronic devices other than a first electronic device operating as a lead electronic device. Procedure 810 can comprise a process of removing each electronic device of the multiple electronic devices other than the first electronic device operating as the lead electronic device from a connected users group.

After procedure 810, method 800 can comprise an optional procedure (not shown) of passing control of the communication hub to the first device operating as the lead electronic device.

Also after procedure 810, method 800 can comprise procedure 820 of requesting of the first electronic device operating as the lead electronic device if a new session should be started with the communication hub. If the lead electronic device requests to start the new session, method 800 can comprise procedure 860. Performing procedure 860 can be similar or identical to performing method 500 (FIG. 5). For example, procedure 860 can comprise assigning one electronic device of other multiple electronic devices to operate as an active electronic device. The other multiple electronic devices can be the same electronic devices as the previous electronic devices, and/or the other multiple electronic devices can comprise more, less, or different electronic devices than the previous electronic devices. In any event, like the previous multiple electronic devices, the other multiple electronic devices can continue to comprise the first electronic device. If the lead electronic device requests not to start the new session, method 800 can comprise procedure 830. Procedure 830 can comprise disconnecting the first electronic device operating as the lead electronic device from the communication hub. Method 800 can also continue with procedure 840 of purging all internal cache from a previous session of the communication hub. Method 800 can then comprise procedure 850 of waiting (e.g., in standby mode) for one of (a) a user of the communication hub to deactivate the communication hub or (b) a request from another electronic device to start the new session.

Skipping ahead in the drawings, FIG. 13 illustrates a flow chart for an exemplary embodiment of method 1300 of using a software application at an electronic device of multiple electronic devices to permit communication between the electronic device and a communication hub. Method 1300 is merely exemplary and is not limited to the embodiments presented herein. Method 1300 can be employed in many different embodiments or examples not specifically depicted or described herein. In some embodiments, the procedures, the processes, and/or the activities of method 1300 can be performed in the order presented. In other embodiments, the procedures, the processes, and/or the activities of method 1300 can be performed in any other suitable order. In still other embodiments, one or more of the procedures, the processes, and/or the activities in method 1300 can be combined or skipped. The multiple electronic devices can be similar or identical to multiple electronic devices 1602 (FIG. 16). The communication hub can be similar or identical to communication hub 1601 (FIG. 16).

In using system 1600 (FIG. 16), user(s) 1606 (FIG. 16) can perform part or all of method 1300 upon entering a conference room. For example, user(s) 1606 can launch the software application on their respective electronic device(s) of multiple electronic devices 1602 (FIG. 16) upon entering a conference room. The software application can then initiate a scan to find communication hub 1601 (FIG. 16). In some embodiments, there can be a pairing mechanism (e.g., the software application can ask user(s) 1606 to enter a code) that user(s) 1606 can be required to provide to pair with communication hub 1601 (FIG. 16). The code can be permanently or temporarily displayed on communication hub 1601 (FIG. 16) (e.g., via a sticker or an electronic display).

Communication hub 1601 (FIG. 16) can assign (e.g., originally) as the active electronic device the first electronic device (e.g., first electronic device 1603 (FIG. 16)) of multiple electronic devices 1602 (FIG. 16) to pair with the communication hub and/or can assign the active electronic device according to a user list, as described above with respect to system 1600 (FIG. 16). Accordingly, the software application can permit a first user of user(s) 1606 (FIG. 16) operating the active electronic device to enter a name. The communication hub can then receive audio-visual data from the active electronic device and provide the audio-visual data to at least one audio-visual device. The audio-visual device can be similar or identical to audio-visual device 1605 (FIG. 16).

When another electronic device (e.g., electronic device 1604) pairs with communication hub 1601 (using method 1300), it becomes a passive electronic device. Each passive electronic device can be assigned an icon having the passive electronic device's name, and the icon can be displayed in the software application running on the active electronic device. The active electronic device can select any passive electronic device and tap on the icon. Tapping the icon can initiate method 700 (FIG. 7) to pass control of communication hub 1601 to the selected passive electronic device.

When user(s) 1606 (FIG. 16) are finished using system 1600 (FIG. 16), user(s) 1606 (FIG. 16) can disconnect from communication hub 1601 (FIG. 16) by closing the software application (e.g., initiating method 800). When the active electronic device closes the software application, the next passive electronic device can become the active electronic device.

In FIG. 13, method 1300 can comprise process 1301 of starting the process by downloading the software application. If the electronic device already has the software application, process 1301 can be omitted.

Referring again to FIG. 13, method 1300 can comprise procedure 1305 of launching the software application.

Method 1300 can continue with procedure 1310 of calling a proprietary or third-party network configuration API, such as, for example a zero configuration networking service (e.g., Bonjour) to locate and identify the communication hub(s). If the communication hub(s) are not located and identified, method 1300 can comprise procedure 1311 of continuing to locate and identify the communication hub(s). If the communication hubs are located and identified, method 1300 comprises procedure 1320 of calling the communication hub's application programming interface and initiating communication with the communication hub.

After procedure 1320, method 1300 can comprise procedure 1330 of administrating communication between the communication hub and the software application and assigning the first electronic device either active electronic device status or passive electronic device status. The active electronic device can be similar or identical to the active electronic device described above with respect to system 1600 (FIGS. 9-12, 16).

Next, method 1300 can comprise procedure 1335 of determining a user status of the first electronic device as either active electronic device status or passive electronic device status. In some embodiments, procedure 1335 can be part of procedure 1330. If the user status is determined to be passive electronic device status, method 1300 can comprise procedure 1340 of waiting for the communication hub to assign the electronic device with active electronic device status. If the user status is determined to be active electronic device status, method 1300 can comprise procedure 1350 of packetizing and sending audio-visual data to the communication hub via the communication hub application programming interface.

After procedure 1350, method 1300 can comprise procedure 1355 of determining if the electronic device has released its active electronic device status. If active electronic device status has not been released, procedure 1350 can be repeated. If active electronic device status has been released, method 1300 can comprise procedure 1360 of notifying the communication hub that the first electronic device is no longer the active electronic device.

Method 1300 can comprise procedure 1370 of assigning active electronic device status to another electronic device of the multiple electronic devices. In many embodiments, procedure 1370 can be performed after procedure 1360 is performed and/or occurs.

Figure 19:
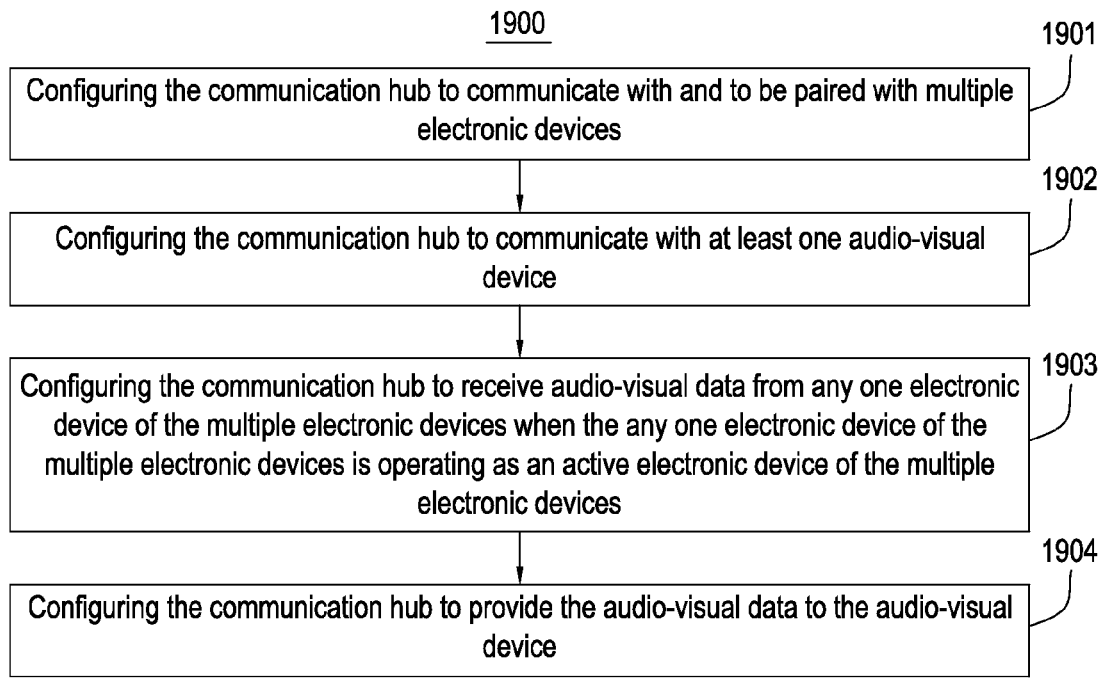
FIG. 19 illustrates a flow chart for an exemplary embodiment of a method of manufacturing a communication hub.

Skipping ahead in the drawings, FIG. 19 illustrates a flow chart for an exemplary embodiment of method 1900 of manufacturing a communication hub. Method 1900 is merely exemplary and is not limited to the embodiments presented herein. Method 1900 can be employed in many different embodiments or examples not specifically depicted or described herein. In some embodiments, the procedures, the processes, and/or the activities of method 1900 can be performed in the order presented. In other embodiments, the procedures, the processes, and/or the activities of method 1900 can be performed in any other suitable order. In still other embodiments, one or more of the procedures, the processes, and/or the activities in method 1900 can be combined or skipped. The communication hub can be similar or identical to communication hub 1600 (FIGS. 9-12, 16).

Method 1900 can comprise activity 1901 of configuring the communication hub to communicate with and to be paired with multiple electronic devices. The multiple electronic devices can be similar or identical to multiple electronic devices 1602 (FIG. 16).

Method 1900 can comprise activity 1902 of configuring the communication hub to communicate with at least one audio-visual device. The audio-visual device(s) can be similar to audio-visual device(s) 1605 (FIG. 16).

Method 1900 can comprise activity 1903 of configuring the communication hub to receive audio-visual data from any one electronic device of the multiple electronic devices when the electronic device is operating as an active electronic device of the multiple electronic devices. The active electronic device can be similar or identical to the active electronic device described above with respect to system 1600 (FIGS. 9-12, 16).

Method 1900 can comprise activity 1904 of configuring the communication hub to provide the audio-visual data to the audio-visual device. In many embodiments, one or more of activities 1901 through 1904 can be performed approximately simultaneously with each other. In other embodiments, one or more of activities 1901 through 1904 can be performed in a different order with one or more other of activities 1901 through 1904.

Turning to the next drawing, FIG. 20 illustrates a flow chart for an exemplary embodiment of method 2000 of manufacturing a communication hub software application to be used at an electronic device. Method 2000 is merely exemplary and is not limited to the embodiments presented herein. Method 2000 can be employed in many different embodiments or examples not specifically depicted or described herein. In some embodiments, the procedures, the processes, and/or the activities of method 2000 can be performed in the order presented. In other embodiments, the procedures, the processes, and/or the activities of method 2000 can be performed in any other suitable order. In still other embodiments, one or more of the procedures, the processes, and/or the activities in method 2000 can be combined or skipped. The communication hub application software can be similar or identical to the communication hub application software described above with respect to system 1600 (FIGS. 9-12, 16). Further, the communication hub application software can be executed at one or more processing modules and/or stored at one or more memory storage modules of an electronic device computer system. The electronic device computer system can be similar or identical to computer system 1400 (FIG. 14).

Method 2000 can comprise activity 2001 of configuring the communication hub application software to permit the electronic device to be paired with a communication hub when the electronic device is communicating with the communication hub. The communication hub can be similar or identical to communication hub 1601 (FIG. 16). Accordingly, the communication hub is configured to communicate with multiple electronic devices and at least one audio-visual device. The multiple electronic devices can be similar or identical to multiple electronic devices 1602 (FIG. 16), and the audio-visual device(s) can be similar or identical to audio-visual device(s) 1605 (FIG. 16). The multiple electronic devices can comprise the electronic device.

Further, method 2000 can comprise activity 2002 of configuring the communication hub application software to permit the electronic device to operate as an active electronic device of the multiple electronic devices. The active electronic device can be similar or identical to the active electronic device described above with respect to system 1600 (FIGS. 9-12, 16).

Turning again to the next drawing, FIG. 21 illustrates a flow chart for an exemplary embodiment of method 2100 of operating a communication hub. Method 2100 is merely exemplary and is not limited to the embodiments presented herein. Method 2100 can be employed in many different embodiments or examples not specifically depicted or described herein. In some embodiments, the procedures, the processes, and/or the activities of method 2100 can be performed in the order presented. In other embodiments, the procedures, the processes, and/or the activities of method 2100 can be performed in any other suitable order. In still other embodiments, one or more of the procedures, the processes, and/or the activities in method 2100 can be combined or skipped. The communication hub can be similar or identical to communication hub 1601 (FIG. 16). At least part of method 2100 can be implemented via execution of computer instructions configured to run at one or more processing modules and configured to be stored at one or more memory storage modules of the communication hub. The processing module(s) can be similar or identical to processor 120 (FIG. 1), and the memory storage module(s) can be similar or identical to memory 150 (FIG. 1).

Method 2100 can comprise activity 2101 of establishing communication of the communication hub with at least one audio-visual device. The audio-visual device(s) can be similar or identical to audio-visual devices 1605 (FIG. 16)

Method 2100 can comprise activity 2102 of establishing communication of the communication hub with, and pairing the communication hub with, multiple electronic devices. The multiple electronic devices can be similar or identical to multiple electronic devices 1602 (FIG. 16). In some embodiments, activity 2012 can comprise communicating with one or more electronic devices of the multiple electronic devices via an integrated wireless access point. In these embodiments, activity 2201 can comprise (a) communicating with one or more electronic devices of the multiple electronic devices via an integrated wireless access point of the communication hub and/or (b) (1) tethering the communication hub with a tethered electronic device of the multiple electronic devices such that the tethered electronic device operates as the integrated wireless access point and (2) communicating with one or more electronic devices of the multiple electronic devices via the tethered electronic device of the multiple electronic devices. Further, activity 2102 can comprise communicating with one or more electronic devices of the multiple electronic devices via at least one of a wired network connection or an external wireless access point. The internal wireless access point, the wired network connection, and/or the external wireless access point can be similar or identical to the internal wireless access point, the wired network connection, and/or the external wireless access point described above with respect to system 1600 (FIGS. 9-12, 16).

Method 2100 can comprise activity 2103 of assigning an active electronic device status to a first electronic device of the multiple electronic devices. In some embodiments, activity 2103 can be performed during or after activity 2102. In many embodiments, the active electronic device status can be similar or identical to the status of the active electronic device described above with respect to system 1600 (FIGS. 9-12, 16).

Method 2100 can comprise activity 2104 of receiving first audio-visual data from the first electronic device when the first electronic device is operating with the active electronic device status.

Method 2100 can comprise activity 2105 of providing the first audio-visual data to the at least one audio-visual device. In some embodiments, activity 2105 can be performed during or after activity 2101 and/or activity 2104. For example, in some embodiments, activity 2104 and activity 2105 can occur approximately simultaneously with each other.

Method 2100 can comprise activity 2106 of receiving requests at an application program interface of the communication hub from a communication hub software application of each electronic device of the multiple electronic devices to initiate communication with and pair with the communication hub. In some embodiments, activity 2106 can occur before one or more of activities 2101 through 2105.

Method 2100 can comprise activity 2107 of receiving first control data from the first electronic device when the first electronic device is operating with the active electronic device status. In some embodiments, activity 2107 can occur approximately simultaneously with activity 2104 and/or activity 2105.

Method 2100 can comprise activity 2108 of assigning a lead electronic device status to a lead electronic device of the multiple electronic devices. The lead electronic device can be similar or identical to the lead electronic device described above with respect to system 1600 (FIGS. 9-12, 16). In some embodiments, activity 2108 can occur before or during one or more of activities 2103 through 2105 and/or 2107.

Method 2100 can comprise activity 2109 of receiving a request from the first electronic to assign the active electronic device status to another electronic device of the multiple electronic devices. Further, method 2100 can comprise activity 2110 of assigning the active electronic device status to the other electronic device of the multiple electronic devices. Accordingly, activity 2109 and/or activity 2110 can occur during or after one or more of activities 2104 through 2107. Further still, activity 2109 and activity 2110 can occur approximately simultaneously with each other.

Although the invention has been described with reference to specific embodiments, it will be understood by those skilled in the art that various changes can be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that procedures 310, 315, 317, 320, 330, 340, 350, 360, 370, 380, and/or 390 of FIG. 3, procedures 410, 420, 421-427, 430, 440, 450, 460, 470, and/or 480 of FIG. 4, procedures 510, 520, 530, 540, 550, and/or 560 of FIGS. 5 & 17, procedures 515, 565, 570, and/or 580 of FIG. 17, procedures 610, 615, 620, 625, 630, and/or 640 of FIG. 6, procedures 710, 720, and/or 750 of FIGS. 7 and 18, procedure 715 of FIG. 18, procedures 810, 820, 830, 840, 850, and/or 860 of FIG. 8, procedures 1302, 1305, 1310, 1311, 1320, 1330, 1335, 1340, 1350, 1355, 1360, and/or 1370 of FIG. 13, activities 1901-1904 of FIG. 19, activities 2001 and 2002 of FIG. 20, and/or activities 2101-2110 of FIG. 21 can be comprised of many different procedures, processes, and activities and be performed by many different modules, in many different orders, that any element of FIGS. 1-21 can be modified, and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   a communication hub configured (a) to communicate with multiple electronic devices and at least one audio-visual device and (b) to be paired with the multiple electronic devices when communicating with the multiple electronic devices;
   wherein:
      the multiple electronic devices are separate from the communication hub;
      the communication hub is configured to receive audio-visual data from any one electronic device of the multiple electronic devices when the any one electronic device of the multiple electronic devices is operating as an active electronic device of the multiple electronic devices;
      the communication hub is configured to provide the audio-visual data to the at least one audio-visual device;
      the at least one audio-visual device is configured to present the audio-visual data to at least one user of the system;
      the communication hub is configured to be controlled by the active electronic device;
      a second electronic device of the multiple electronic devices is able to operate as a lead electronic device of the multiple electronic devices;
      the communication hub is configured to be controlled by the lead electronic device; and
      the lead electronic device is able to override control of the communication hub by the active electronic device when the lead electronic device and the active electronic device are different electronic devices of the multiple electronic devices and are both paired with the communication hub at the same time.

2. The system of claim 1 wherein at least one of:
   the active electronic device is able to designate any one other electronic device of the multiple electronic devices to operate as the active electronic device and is able to undesignate itself as the active electronic device;

the multiple electronic devices comprise one or more mobile electronic devices;

the at least one audio-visual device comprises at least one of an electronic visual display, an image projector, or a speaker; or the communication hub is configured to communicate with at least one first electronic device of the multiple electronic devices via at least one of a wired network connection or an external wireless access point.

3. The system of claim 1 wherein:

the lead electronic device is able to establish a pass code permitting predetermined electronic devices to be paired with the communication hub, the multiple electronic devices comprising the predetermined electronic devices.

4. The system of claim 1 wherein:

the lead electronic device is able to establish an allowed user list permitting predetermined electronic devices to be paired with the communication hub, the multiple electronic devices comprising the predetermined electronic devices.

5. The system of claim 1 wherein:

each electronic device of the multiple electronic devices comprises an electronic device computer system, respectively;

each electronic device computer system comprises one or more processing modules and one or more memory storage modules, respectively;

each electronic device of the multiple electronic devices is configured to use a communication hub software application, respectively;

each communication hub software application is configured to be operated at the one or more processing modules and to be stored at the one or more memory storage modules of one electronic device computer system, respectively, of the each electronic device of the multiple electronic devices; and the communication hub application software is configured to permit each electronic device of the multiple electronic devices (a) to be paired with the communication hub and (b) to operate as the active electronic device at different times.

6. The system of claim 1 wherein:

each electronic device of the multiple electronic devices is configured to communicate with a central electronic device computer system;

the central electronic device computer system comprises one or more processing modules and one or more memory storage modules;

each electronic device of the multiple electronic devices is configured to use a communication hub software application;

the communication hub software application is configured to be operated at the one or more processing modules and to be stored at the one or more memory storage modules of the central electronic device computer system; and the communication hub application software is configured to permit each electronic device of the multiple electronic devices (a) to be paired with the communication hub and (b) to operate as the active electronic device at different times.

7. The system of claim 1 wherein:

the communication hub is configured to communicate with at least one other electronic device of the multiple electronic devices via an integrated wireless access point.

8. The system of claim 7 wherein:

the communication hub comprises the integrated wireless access point.

9. The system of claim 7 wherein:

the communication hub is configured to be tethered with a tethered electronic device of the multiple electronic devices, the tethered electronic device being configured (a) to communicate with at least one of an external wireless access point or a cellular telephone network and (b) to operate as the integrated wireless access point when the communication hub is tethered with the tethered electronic device.

10. A system comprising:

a communication hub application software configured to be used at an electronic device;

wherein:

the communication hub application software is configured to be executed at one or more processing modules and stored at one or more memory storage modules of an electronic device computer system;

the communication hub application software permits the electronic device to be paired with a communication hub when the electronic device is communicating with the communication hub, the communication hub being configured to communicate with multiple electronic devices and at least one audio-visual device, and the multiple electronic devices (a) being separate from the communication hub and (b) comprising the electronic device;

the communication hub application software further permits the electronic device to operate as an active electronic device of the multiple electronic devices, the active electronic device being able to provide audio-visual data to the communication hub when the electronic device is operating as the active electronic device of the multiple electronic devices;

the communication hub is configured to provide the audio-visual data to the at least one audio-visual device;

the at least one audio-visual device is configured to present the audio-visual data to at least one user of the system;

the active electronic device is able to control the communication hub via the communication hub application software;

the communication hub application software further permits a second electronic device of the multiple electronic devices to operate as a lead electronic device of the multiple electronic devices, the lead electronic device being able to control the communication hub via the communication hub application software; and the lead electronic device is able to override control of the communication hub by the active electronic device when the lead electronic device and the active electronic device are different electronic devices of the multiple electronic devices and are both coupled to the communication hub simultaneously.

11. The system of claim 10 wherein at least one of:

when the electronic device is operating as the active electronic device of the multiple electronic devices, the communication hub application software permits the electronic device to designate any one other electronic device of the multiple electronic devices to operate as the active electronic device and is able to undesignate itself as the active electronic device;

the electronic device comprises a mobile electronic device; or the at least one audio-visual device comprises at least one of an electronic visual display, an image projector, or a speaker.

12. The system of claim 10 wherein:
the lead electronic device is able to establish at least one of a pass code or an allowed user list permitting a predetermined electronic device to be paired with the communication hub, the multiple electronic devices comprising the predetermined electronic device.

13. The system of claim 10 wherein:
the electronic device comprises the electronic device computer system.

14. A method of manufacturing a communication hub, the method comprising:
configuring the communication hub to communicate with and to be paired with multiple electronic devices, the multiple electronic devices being separate from the communication hub;
configuring the communication hub to communicate with at least one audio-visual device;
configuring the communication hub to receive audio-visual data from any one electronic device of the multiple electronic devices when the any one electronic device of the multiple electronic devices is operating as an active electronic device of the multiple electronic devices;
configuring the communication hub to provide the audio-visual data to the at least one audio-visual device, the at least one audio-visual device being configured to present the audio-visual data to at least one user of the communication hub;
configuring the communication hub to be controlled by the active electronic device of the multiple electronic devices when the any one electronic device of the multiple electronic devices is operating as the active electronic device of the multiple electronic devices; and
configuring the communication hub to be controlled by a second electronic device of the multiple electronic devices when the second electronic device of the multiple electronic devices is operating as a lead electronic device of the multiple electronic devices;
wherein:
the lead electronic device is able to override control of the communication hub by the active electronic device when the lead electronic device and the active electronic device are different electronic devices of the multiple electronic devices and are coupled simultaneously to the communication hub.

15. The method of claim 14 wherein:
configuring the communication hub to communicate with and to be paired with the multiple electronic devices comprises configuring the communication hub to communicate with at least one electronic device of the multiple electronic devices via an integrated wireless access point;
wherein one of:
the communication hub comprises the integrated wireless access point; or
the communication hub is configured to be tethered with a tethered electronic device of the multiple electronic devices, the tethered electronic device being configured (a) to communicate with at least one of an external wireless access point or a cellular telephone network and (b) to operate as the integrated wireless access point when the communication hub is tethered with the tethered electronic device.

16. The method of claim 14 wherein at least one of:
the lead electronic device is able to establish at least one of a pass code or an allowed user list permitting a predetermined electronic device to be paired with the communication hub, the multiple electronic devices comprising the predetermined electronic device; or
the lead electronic device comprises the active electronic device.

17. A method of manufacturing a communication hub application software to be used at an electronic device, the communication hub application software being configured to be executed at one or more processing modules and stored at one or more memory storage modules of an electronic device computer system, the method comprising:
configuring the communication hub application software to permit the electronic device to be paired with a communication hub when the electronic device is communicating with the communication hub, the communication hub being configured to communicate with multiple electronic devices and at least one audio-visual device and the multiple electronic devices (a) being separate from the communication hub and (b) comprising the electronic device;
configuring the communication hub application software to permit the electronic device to operate as an active electronic device of the multiple electronic devices, the active electronic device being able to control the communication hub and to provide audio-visual data to the communication hub when the electronic device is operating as the active electronic device of the multiple electronic devices where the communication hub is configured to provide the audio-visual data to the at least one audio-visual device and the at least one audio-visual device is configured to present the audio-visual data to at least one user of the electronic device computer system; and
configuring the communication hub application software to permit a second electronic device of the multiple electronic devices to operate as a lead electronic device of the multiple electronic devices, the lead electronic device being able to control the communication hub;
wherein:
the lead electronic device is able to override control of the communication hub by the active electronic device when the lead electronic device and the active electronic device are different electronic devices of the multiple electronic devices and are both coupled to the communication hub at the same time.

18. The method of claim 17 wherein at least one of:
the lead electronic device is able to establish at least one of a pass code or an allowed user list permitting a predetermined electronic device to be paired with the communication hub, the multiple electronic devices comprising the predetermined electronic device.

19. The method of claim 17 wherein:
the electronic device comprises the electronic device computer system.

20. A method of operating a communication hub, at least part of the method being implemented via execution of computer instructions configured to run at one or more processing modules and configured to be stored at one or more memory storage modules of the communication hub, the method comprising:
executing one or more first computer instructions configured to establish communication with the communication hub by at least one audio-visual device;

executing one or more second computer instructions configured to establish communication with the communication hub by, and to pair the communication hub with, multiple electronic devices;

after or when executing the one or more second computer instructions, executing one or more third computer instructions configured to assign an active electronic device status to a first electronic device of the multiple electronic devices, the first electronic device of the multiple electronic devices being able to control the communication hub when operating with the active electronic device status;

executing one or more fourth computer instructions configured to receive first audio-visual data from the first electronic device when the first electronic device is operating with the active electronic device status;

after or when executing the one or more first computer instructions or the one or more fourth computer instructions, executing one or more fifth computer instructions configured to provide the first audio-visual data to the at least one audio-visual device; and after or when executing the one or more second computer instructions, executing one or more sixth computer instructions configured to assign a lead electronic device status to a lead electronic device of the multiple electronic devices, the lead electronic device being able to control the communication hub when operating with the lead electronic device status and being able to override control of the communication hub by the first electronic device when the first electronic device is operating with the active electronic device status and when the first electronic device and the lead electronic device are both coupled simultaneously to the communication hub;

wherein:
  the computer instructions comprise the one or more first, second, third, fourth, fifth and sixth computer instructions.

21. The method of claim 20 wherein:
executing the one or more second computer instructions comprises executing one or more seventh computer instructions configured to communicate with at least one second electronic device of the multiple electronic devices via an integrated wireless access point.

22. The method of claim 21 wherein:
executing the one or more seventh computer instructions comprises one of:
  executing one or more eighth computer instructions configured to communicate with the at least one second electronic device of the multiple electronic devices via the integrated wireless access point, wherein the communication hub comprises the integrated wireless access point; or
  executing one or more ninth computer instructions configured to tether the communication hub with a tethered electronic device of the multiple electronic devices such that the tethered electronic device operates as the integrated wireless access point and to communicate with the at least one second electronic device of the multiple electronic devices via the tethered electronic device of the multiple electronic devices.

23. The method of claim 20 wherein:
the lead electronic device is able to establish a pass code permitting predetermined electronic devices to be paired with the communication hub, the multiple electronic devices comprising the predetermined electronic devices.

24. The method of claim 20 wherein:
the lead electronic device is able to establish an allowed user list permitting predetermined electronic devices to be paired with the communication hub, the multiple electronic devices comprising the predetermined electronic devices.

* * * * *